(12) United States Patent
Chen et al.

(10) Patent No.: US 9,958,550 B2
(45) Date of Patent: May 1, 2018

(54) NAVIGATION SATELLITE SYSTEM POSITIONING INVOLVING THE GENERATION OF RECEIVER-SPECIFIC OR RECEIVER-TYPE-SPECIFIC CORRECTION INFORMATION

(71) Applicant: Trimble Inc., Sunnyvale, CA (US)

(72) Inventors: Xiaoming Chen, Höhenkirchen-Siegertsbrunn (DE); Andrea Nardo, Höhenkirchen-Siegertsbrunn (DE)

(73) Assignee: Trimble Inc., Sunnyvale, CA (US)

(*) Notice: Subject to any disclaimer, the term of this patent is extended or adjusted under 35 U.S.C. 154(b) by 343 days.

(21) Appl. No.: 14/825,421

(22) Filed: Aug. 13, 2015

(65) Prior Publication Data
US 2016/0047917 A1 Feb. 18, 2016

(30) Foreign Application Priority Data

Aug. 14, 2014 (EP) .................................. 14181007

(51) Int. Cl.
*G01S 19/40* (2010.01)
*G01S 19/23* (2010.01)
(Continued)

(52) U.S. Cl.
CPC ............. *G01S 19/40* (2013.01); *G01S 19/23* (2013.01); *G01S 19/43* (2013.01); *G01S 19/44* (2013.01)

(58) Field of Classification Search
CPC .......... G01S 19/40; G01S 19/23; G01S 19/43; G01S 19/07; G01S 19/44
(Continued)

(56) References Cited

U.S. PATENT DOCUMENTS 5,805,108 A * 9/1998 Lennen .................... G01S 19/29
342/357.68
7,221,314 B2 * 5/2007 Brabec ................. G01C 15/002
342/357.27
(Continued)

FOREIGN PATENT DOCUMENTS

WO 2011/034614 A2 3/2011
WO 2011/034616 A2 3/2011

OTHER PUBLICATIONS

Altamimi, Z., et al., "ITRF2008: an improved solution of the international terrestrial reference frame," Journal of Geodesy, vol. 85, No. 8, p. 457-473, 2011.
(Continued)

*Primary Examiner* — Chuong P Nguyen
(74) *Attorney, Agent, or Firm* — Kilpatrick Townsend & Stockton LLP

(57) ABSTRACT

The invention relates to methods, apparatuses and computer programs for generating receiver-specific correction information for correcting pseudorange observations. The method comprises: receiving raw observations obtained by the NSS receiver observing NSS multiple frequency signals from a plurality of NSS satellites over multiple epochs; obtaining precise satellite information on: (i) the orbit position of each of the satellites, (ii) a clock offset of each of the satellites, and (iii) a set of biases associated with each of the satellites; estimating ambiguities in the carrier phase of the received raw observations, using the precise satellite information, or information derived therefrom; computing combination values based on the received raw observations together with the estimated ambiguities, to cancel out the effects of the geometry, the effects of the clocks, troposphere and ionosphere; and generating the correction information per satellite, based on the computed combination values.

15 Claims, 13 Drawing Sheets

(51) Int. Cl.
*G01S 19/44* (2010.01)
*G01S 19/43* (2010.01)

(58) Field of Classification Search
USPC ............ 342/357.23, 357.26, 357.27, 357.44, 342/357.62
See application file for complete search history.

(56) References Cited

U.S. PATENT DOCUMENTS

| | | | | |
|---|---|---|---|---|
| 7,256,730 | B2* | 8/2007 | Hernandez-Pajares | G01S 19/32 342/357.27 |
| 7,522,099 | B2* | 4/2009 | Zhodzishsky | G01C 21/00 342/357.24 |
| 8,174,437 | B2* | 5/2012 | Whitehead | G01S 19/33 342/357.24 |
| 8,587,475 | B2* | 11/2013 | Leandro | G01S 19/43 342/357.27 |
| 8,760,343 | B2* | 6/2014 | Milyutin | G01S 19/20 342/357.27 |
| 8,847,820 | B2* | 9/2014 | Landau | G01S 19/04 342/357.66 |
| 9,164,174 | B2* | 10/2015 | Chen | G01S 19/04 |
| 2002/0021241 | A1* | 2/2002 | Zhodzishky | G01S 19/37 342/357.27 |
| 2011/0210889 | A1* | 9/2011 | Dai | G01S 19/235 342/357.29 |
| 2012/0092213 | A1* | 4/2012 | Chen | G01S 19/32 342/26 A |
| 2012/0163419 | A1 | 6/2012 | Seeger | |
| 2013/0044026 | A1 | 2/2013 | Chen et al. | |
| 2016/0077213 | A1* | 3/2016 | Xianglin | G01S 19/24 342/357.27 |

OTHER PUBLICATIONS

Al-Shaery, A., et al., "An enhanced calibration method of GLONASS inter-channel bias for GNSS RTK," GPS Solutions (2013) 17:165-173.
Leandro, R., et al., "RTX Positioning: The Next Generation of cm-accurate Real-Time GNSS Positioning," ION-GNSS-2011, Sep. 20-23, 2011, Portland, Oregon, 16 pages.
Ge, J., et al., "Resolution of GPS carrier-phase ambiguities in Precise Point Positioning (PPP) with daily observations," Journal of Geodesy, 2008, 82:389-399, 11 pages.
Reussner, N., et al., GLONASS Inter-frequency Biases and Their Effects on RTK and PPP Carrier-phase Ambiguity Resolution, Proc. of ION GNSS 2011, Portland, OR, pp. 712-716.
Yamada, H., et al., "Evaluation and Calibration of Receiver Inter-channel Biases for RTK-GPS/GLONASS," 23$^{rd}$ International Technical Meeting of the Satellite Division of the Institute of Navigation, Portland, Oregon 2010, 22 pages.
Zhibo Wen, et al., "Multi-Stage Satellite Phase and Code Bias Estimation," Journal for Control Measurement, Electronics, Computing and Communications, vol. 53, No. 4, Dec. 31, 2012, 10 pages.
European Search Report for Application No. EP 14 181 007.7, date of Completion of the Search Jan. 27, 2015, 4 pages.

* cited by examiner

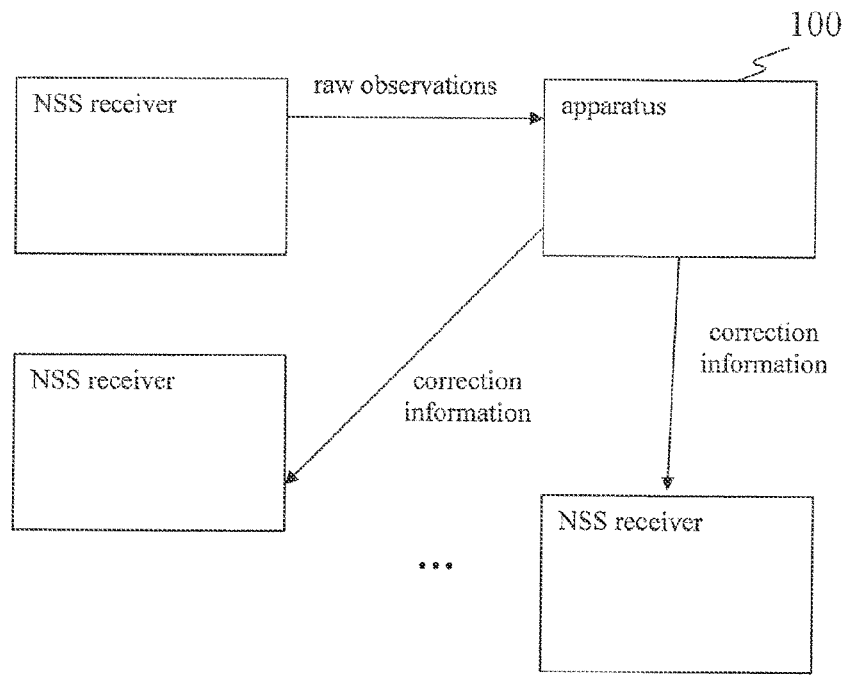
Fig. 11c
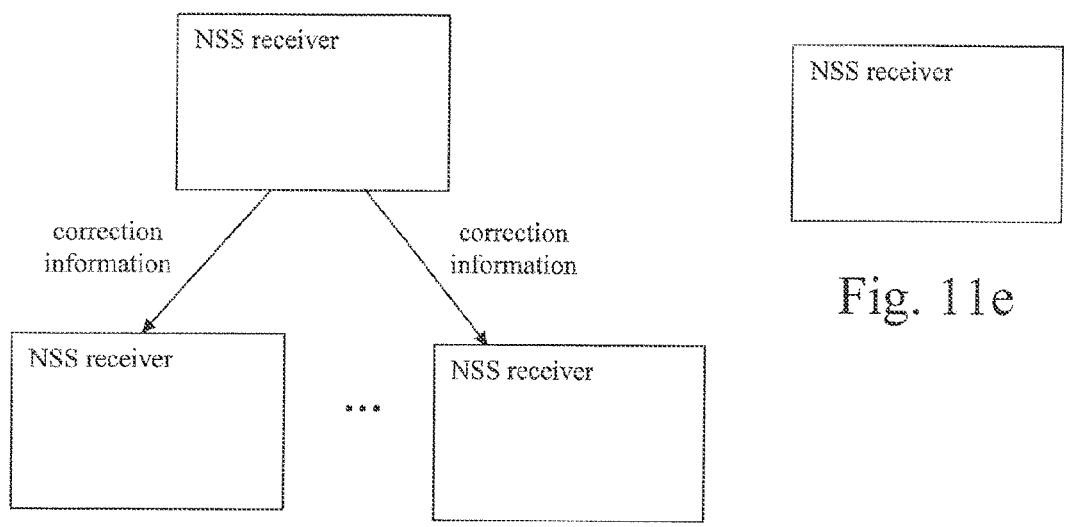
Fig. 11e
Fig. 11d

NAVIGATION SATELLITE SYSTEM POSITIONING INVOLVING THE GENERATION OF RECEIVER-SPECIFIC OR RECEIVER-TYPE-SPECIFIC CORRECTION INFORMATION

CROSS-REFERENCE TO RELATED APPLICATIONS

This application claims priority to European Application No. 14 181 007.7, filed Aug. 14, 2014, the entire contents of which are incorporated herein by reference in their entirety for all purposes.

FIELD OF TECHNOLOGY

The invention relates to global or regional navigation satellite systems (NSS) position estimation methods, devices and computer programs. The fields of application of the methods, devices and computer programs include, but are not limited to, navigation, map-making, land surveying, civil engineering, agriculture, disaster prevention and relief, and scientific research.

BACKGROUND

Navigation satellite systems (NSS) include both global navigation satellite systems (GNSS) and regional navigation satellite systems (RNSS), such as the Global Positioning System (GPS) (United States), GLONASS (Russia), Galileo (Europe), BeiDou (China), QZSS (Japan), and the Indian Regional Navigational Satellite System (IRNSS) (systems in use or in development). A NSS typically uses a plurality of satellites orbiting the Earth. The plurality of satellites forms a constellation of satellites. A NSS receiver detects a code modulated on an electromagnetic signal broadcast by a satellite. The code is also called a ranging code. Code detection includes comparing the bit sequence modulated on the broadcasted signal with a receiver-side version of the code to be detected. Based on the detection of the time of arrival of the code for each of a series of the satellites, the NSS receiver estimates its position. Positioning includes, but is not limited to, geolocation, i.e. the positioning on the surface of the Earth.

An overview of GPS, GLONASS and Galileo is provided for instance in sections 9, 10 and 11 of Hofmann-Wellenhof B., et al., *GNSS, Global Navigation Satellite Systems, GPS, GLONASS, Galileo, & more*, Springer-Verlag Wien, 2008, (hereinafter referred to as "reference [1]").

Positioning using NSS signal codes provides a limited accuracy, notably due to the distortion the code is subject to upon transmission through the atmosphere. For instance, the GPS includes the transmission of a coarse/acquisition (C/A) code at 1575.45 MHz, the so-called L1 frequency. This code is freely available to the public, whereas the Precise (P) code is reserved for military applications. The accuracy of code-based positioning using the GPS C/A code is approximately 15 meters, when taking into account both the electronic uncertainty associated with the detection of the C/A code (electronic detection of the time of arrival of the pseudo-random code) and other errors including those caused by ionospheric and tropospheric effects, ephemeris errors, satellite clock errors and multipath propagation.

An alternative to positioning based on the detection of a code is positioning based on carrier phase measurements. In this alternative approach or additional approach (ranging codes and carrier phases can be used together for positioning), the carrier phase of the NSS signal transmitted from the NSS satellite is detected, not (or not only) the code modulated on the signal transmitted from the satellite.

The approach based on carrier phase measurements has the potential to provide much greater position precision, i.e. up to centimetre-level or even millimetre-level precision, compared to the code-based approach. The reason may be intuitively understood as follows. The code, such as the GPS C/A code on the L1 band, is much longer than one cycle of the carrier on which the code is modulated. The position resolution may therefore be viewed as greater for carrier phase detection than for code detection.

However, in the process of estimating the position based on carrier phase measurements, the carrier phases are ambiguous by an unknown number of cycles. The phase of a received signal can be determined, but the number of cycles cannot be directly determined in an unambiguous manner. This is the so-called "integer ambiguity problem", "integer ambiguity resolution problem" or "phase ambiguity resolution problem", which may be solved to yield the so-called fixed solution.

GNSS observation equations for code observations and for carrier phase observations are for instance provided in reference [1], section 5. An introduction to the GNSS integer ambiguity resolution problem, and its conventional solutions, is provided in reference [1], section 7.2. The skilled person will recognize that the same or similar principles apply to RNSS systems.

The main GNSS observables are therefore the carrier phase and code (pseudorange), the former being much more precise than the latter, but ambiguous. These observables basically enable a user to obtain the geometric distance from the receiver to the satellite. With known satellite position and satellite clock error, the receiver position can be estimated.

Due to different tracking and multipath mitigation technology used by different receivers or different generations of receiver board, significant receiver-dependent satellite code biases exist among different receiver models.

Yamada, H., Takasu, T., Kubo, N., Yasuda, A., Evaluation and calibration of receiver inter-channel biases for RTK-GPS/GLONASS, 23rd international technical meeting of the satellite division of the institute of navigation, Portland, Oreg., USA (2010) (hereinafter referred to as "reference [2]"), found that, for the GLONASS system, the biases may amount to several meters in the L1/L2 band.

Reussner, N., Wanninger, L. GLONASS Inter-frequency Biases and Their Effects on RTK and PPP Carrier-phase Ambiguity Resolution, Proc. of ION GNSS 2011, Portland, Oreg., USA (hereinafter referred to as "reference [3]"), found that the ionosphere-free GLONASS code biases are present also for same receiver type baselines and may amount to several meters. Furthermore, these biases cannot be modelled as a function of the GLONASS channel number k (for more details in that respect, see for example "GLONASS Interface Control Document, Navigational radiosignal In bands L1, L2", Edition 5.1, Moscow, 2008, section 3.3.1.1: "Frequency plan"). Finally, there is evidence that, even for antipodal GLONASS satellites (same channel number k), the biases may reach the meter level. The method disclosed in reference [3] does not allow the estimation of the L1 and L2 biases separately, but only the ionosphere-free combination of such biases.

The effect of the receiver code biases per satellite is apparent when the double-difference multipath combination residuals are computed, as shown in FIG. 2.

The existence of the code biases degrades the positioning accuracy in single-receiver and differential mode. It is thus useful to remove these biases through a proper calibration process. The proper calibration of such biases improves not only the NSS positioning but also the estimates of the receiver and satellites clocks and the medium-induced delays (troposphere and ionosphere). For the end user, this may result in a better precision of the user receiver coordinates achieved in a shorter time span.

A typical calibration process is to use a zero-baseline setup (see reference [2], and Al-Shaery, A., Zhang, S., Rizos, C., An enhanced calibration method of GLONASS interchannel bias for GNSS RTK, GPS Solutions (2013) 17:165-173, hereinafter referred to as "reference [4]"), where at least two receivers are connected to the same physical antenna, and receivers (of the same type) are calibrated with respect to reference receivers (of the same type). With zero-baseline calibration, the code bias of each satellite can be derived from one receiver relative to a reference receiver. This approach is very accurate as the multipath, troposphere and ionosphere effects are cancelled out. The drawback is that the receivers need to be connected to the same antenna. Additional effects due to the antenna and the antenna cable are not accounted for. A zero-baseline setup is schematically illustrated in FIG. 8. The square represents the antenna, and the two rectangles represent the receiver to be calibrated and the reference receiver, respectively.

In some cases, this setup can be substituted by a short-baseline setup. The short-baseline (few meters) calibration reduces the medium-dependent errors, while the geometry is removed by the a-priori knowledge of the antenna coordinates and satellite positions. The antenna effect is accounted for in the short-baseline calibration setup, so that the approach is more suitable to calibrate smart antennas (receiver and antenna integrated in the same housing) than zero-baseline calibration. A short-baseline setup is schematically illustrated in FIG. 9.

There is a constant need for improving the implementation of positioning systems based notably on GNSS (or RNSS) carrier phase measurements, to obtain a precise estimation of the receiver position, in particular in view of the problems associated with the above-mentioned calibration approaches.

SUMMARY

The present invention aims at addressing the above-mentioned need. The invention includes methods, apparatuses, computer programs, computer program products and storage mediums as defined in the independent claims. Particular embodiments are defined in the dependent claims.

In one embodiment of the invention, a method is provided for generating correction information associated with at least one global or regional navigation satellite system receiver (NSS) receiver, wherein the correction information comprises information for correcting pseudorange observations. The pseudorange observations are useful for determining a position of the at least one NSS receiver. The method comprises: receiving raw observations obtained by one of the at least one NSS receiver observing NSS multiple frequency signals from a plurality of NSS satellites over multiple epochs; obtaining information, hereinafter referred to as "precise satellite information", on: (i) the orbit position of each one of the plurality of NSS satellites, (ii) a clock offset of each one of the plurality of NSS satellites, and (iii) a set of biases associated with each one of the plurality of NSS satellites, or obtaining information derived from the precise satellite information; estimating ambiguities in the carrier phase of the received raw observations, using the precise satellite information, or using the information derived therefrom; computing combination values based on the received raw observations together with the estimated ambiguities, to cancel out the effects of the satellite motion relative to the at least one NSS receiver, the effects of the clocks, the effects of the troposphere and the effects of the ionosphere; and generating the correction information per satellite, based on the computed combination values.

The method enables the processing of NSS raw observations to estimate NSS receiver code biases by making use of the precise satellite information, or information derived therefrom, which may for example be in the form of a correction data stream generated based on a network of reference stations. The method typically does not require the use of dedicated equipment (i.e., the use of dedicated hardware) for calibration, as required in the above-discussed zero- and short-baseline approaches, and the method does not require a spatial constraint to be applied. The precise satellite information, or information derived therefrom, may be regarded as acting as a virtual reference in the calibration process. The method enables to improve the positioning of the NSS receiver(s), to improve the ambiguity resolution, and thus reducing the convergence time needed for a carrier-phase-based precise position estimate, to improve the precision of the estimates of nuisance parameters (tropospheric delay, ionospheric delay and receiver clock offset from an NSS time), and/or to detect a hardware problem in an NSS receiver.

In one embodiment, a plurality of receivers of the same or similar type may receive, and therefore benefit from, the same correction information.

In one embodiment, the generated correction information comprises estimated receiver code biases per satellite.

The invention also relates, in one embodiment, to an apparatus configured for generating correction information associated with at least one NSS receiver, wherein the correction information comprises information for correcting pseudorange observations, and the pseudorange observations are useful for determining a position of the at least one NSS receiver. The apparatus comprises a first unit referred to as "raw observations receiving unit", a second unit, referred to as "precise satellite information obtaining unit", a third unit, referred to as "ambiguities estimating unit", a fourth unit, referred to as "combination values computing unit", and a fifth unit, referred to as "correction information generating unit". The raw observations receiving unit is configured for receiving raw observations obtained by one of the at least one NSS receiver observing NSS multiple frequency signals from a plurality of NSS satellites over multiple epochs. The precise satellite information obtaining unit is configured for obtaining precise satellite information on: (i) the orbit position of each one of the plurality of NSS satellites, (ii) a clock offset of each one of the plurality of NSS satellites, and (iii) a set of biases associated with each one of the plurality of NSS satellites, or configured for obtaining information derived from the precise satellite information. The ambiguities estimating unit is configured for estimating ambiguities in the carrier phase of the received raw observations, using the precise satellite information, or using the information derived therefrom. The combination values computing unit is configured for computing combination values based on the received raw observations together with the estimated ambiguities, to cancel out the effects of the satellite motion relative to the at least one NSS receiver, the effects of the clocks, the effects of the troposphere and the effects of the ionosphere. Finally, the correction information generating unit is configured for generating the correction information per satellite, based on the computed combination values.

The invention also relates, in some embodiments, to computer programs, computer program products, and storage mediums for storing such computer programs, comprising computer-executable instructions for carrying out, when executed on a computer such as a NSS receiver or on another apparatus, any one of the above-mentioned methods.

BRIEF DESCRIPTION OF THE DRAWINGS

Embodiments of the present invention shall now be described, in conjunction with the appended drawings in which:

FIG. 5 provides a comparison between the L1CA/L2CA GLONASS biases in metres estimated by a zero-baseline approach (black bars) and an embodiment of the method of the invention (white bars) (zero-baseline experiment on Höhenkirchen, Germany, day of year 149, 2013), confirming similar values between these methods;

FIGS. 11a to 11e schematically illustrate five systems in embodiments of the invention.

DETAILED DESCRIPTION

The present invention shall now be described in conjunction with specific embodiments. The specific embodiments serve to provide the skilled person with a better understanding, but are not intended to in any way restrict the scope of the invention, which is defined by appended claims. In particular, the embodiments described independently throughout the description can be combined to form further embodiments to the extent that they are not mutually exclusive.

Throughout the following detailed description, the abbreviation "GNSS" is used. The invention is, however, not limited to global navigation satellite systems (GNSS) but also applies to regional navigation satellite systems (RNSS). Thus, it is to be understood that each occurrence of "GNSS" in the following can be replaced by "RNSS" to form additional embodiments of the invention.

In the following, it should also be understood that, when it is mentioned that the ambiguities are resolved or regarded as resolved, it is meant that an attempt is made to resolve the ambiguities, the outcome of which will decide if an "ambiguity resolution" method or an "ambiguity reduction" method is employed, both methods being different embodiments of the invention.

Figure 1A:
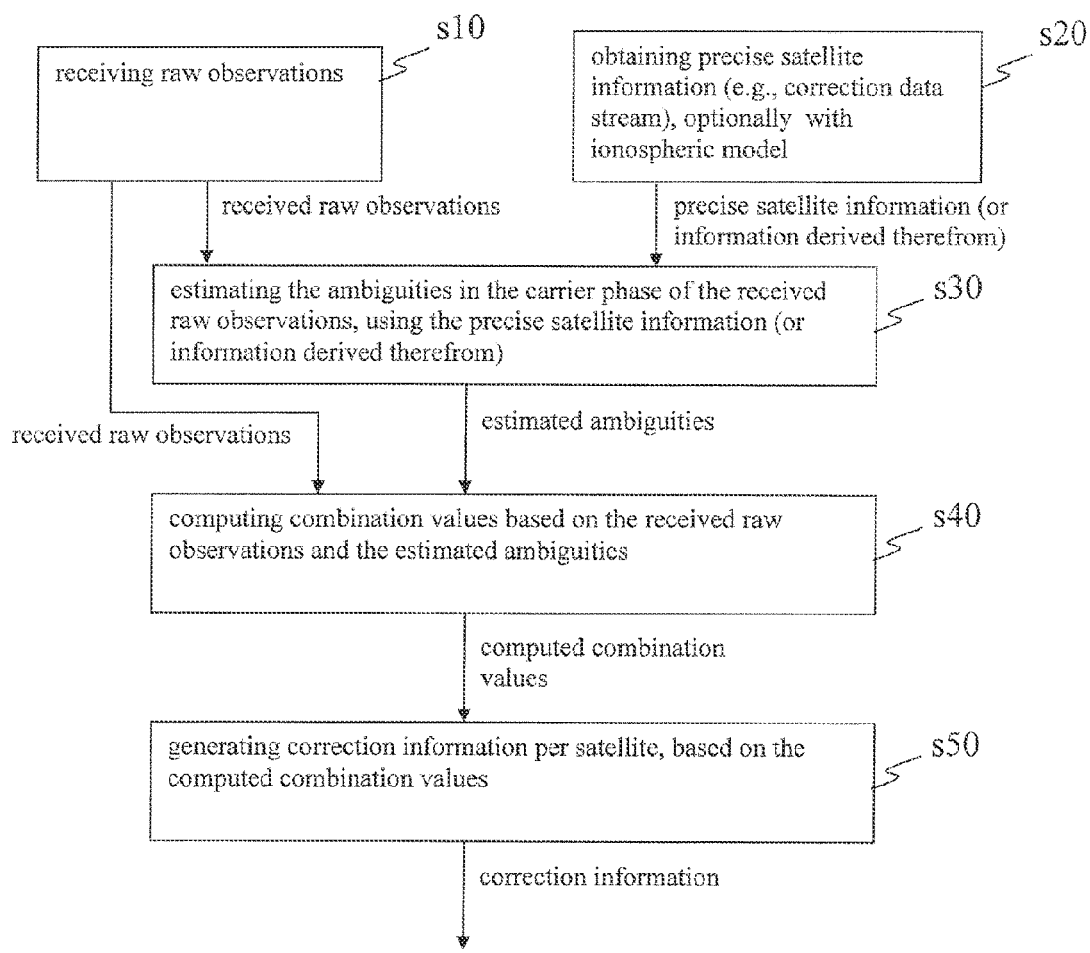
FIG. 1a is a flowchart of a method in one embodiment of the invention.

FIG. 1a is a flowchart of a method according to one embodiment of the invention. The method serves to estimate parameters which are derived at least from GNSS signals and are useful to determine a position, such as the position of a rover receiver or reference station, i.e. the position of a NSS receiver of the same (or similar) type as the one receiving the raw observations. The NSS receiver(s) may be static or moving. The method may eventually lead to determining or estimating the rover position or reference station position, i.e. the position of the NSS receiver. The method may be performed by a receiver and/or a network node.

The method involves generating correction information for the positioning process. The correction information, or, in one embodiment, the receiver code bias, is computed (in steps s40 and s50) based on a precise estimation of the satellite phase and code biases (see step s20) as well as on estimating the ambiguities (step s30). In such a way, the contribution of the satellite biases may be directly removed from the observations, while the medium-dependent delays may be eliminated through the computation of combination values (step s40) such as, for example, through the multipath combination. In particular, the method comprises the following steps.

In step s10, raw observations obtained by one of the NSS receiver(s) observing NSS multiple frequency signals from a plurality of NSS satellites over multiple epochs is received (i.e., received by the apparatus carrying the method, and, if the NSS receiver carries out the method, received internally within the NSS receiver). At least dual frequency data is needed. In other words, in step s10, code pseudorange and carrier phase observations are collected, i.e. obtained, by the NSS receiver to be calibrated, and then distributed within the NSS receiver for further processing or transferred to an apparatus in charge of generating the correction information.

In step s20, precise satellite information, or information derived therefrom, is obtained. The precise satellite information comprises information at least on: (i) the orbit position of each one of the plurality of NSS satellites, (ii) a clock offset of each one of the plurality of NSS satellites, and (iii) a set of biases associated with each one of the plurality of NSS satellites, these set of biases being associated with the hardware delays within the respective satellites. The precise satellite information, or the information derived therefrom, may, in one embodiment, be obtained from a data stream, such as a compressed or uncompressed correction data stream. The precise satellite information may be estimated using data from a network of reference stations connected to a processing station for producing a correction data stream.

In order to improve the positioning process at the NSS receivers, such as to improve the performance of position determination systems, some existing systems involve sending correction information to NSS receivers. Such correction information may generally be seen as comprising information useful to correct NSS observations made by a receiver. For example, the correction information may represent data relating to the NSS system that may be taken into account and used to improve the estimation of the receiver position. The correction information may comprise correction data relating to NSS satellites, such as, but not limited to, accurate orbital data and accurate satellite clock data to improve the positioning solution.

The correction information may be computed or prepared by a network of reference receivers with precisely known positions in a global reference frame (such as, for example, ITRF2008, which is described for example in Z. Altamimi, X. Collilieux, L. Métivier: *ITRF2008: an improved solution of the international terrestrial reference frame*, Journal of geodesy, vol. 85, number 8, page 457-473, 2011). A typically world-wide network of reference receivers is used for GNSS systems, whereas a regional network of reference receivers is typically sufficient for RNSS systems. The data from the reference receivers is transmitted for example over the internet to a processing centre, where the data is collected, synchronized and processed. During the data processing, a variety of products can be generated, including e.g. satellite orbits, satellite clock errors, GNSS (or RNSS) measurement biases, and atmospheric models. The products (or corrections) are then sent to the rover receivers on the field. The transmission to the rover may take place in various different forms, of which the most commonly used are the Internet and satellite links. For a descriptive example of a global GNSS positioning correction service see e.g. WO 2011/034616 A2.

Figure 6:
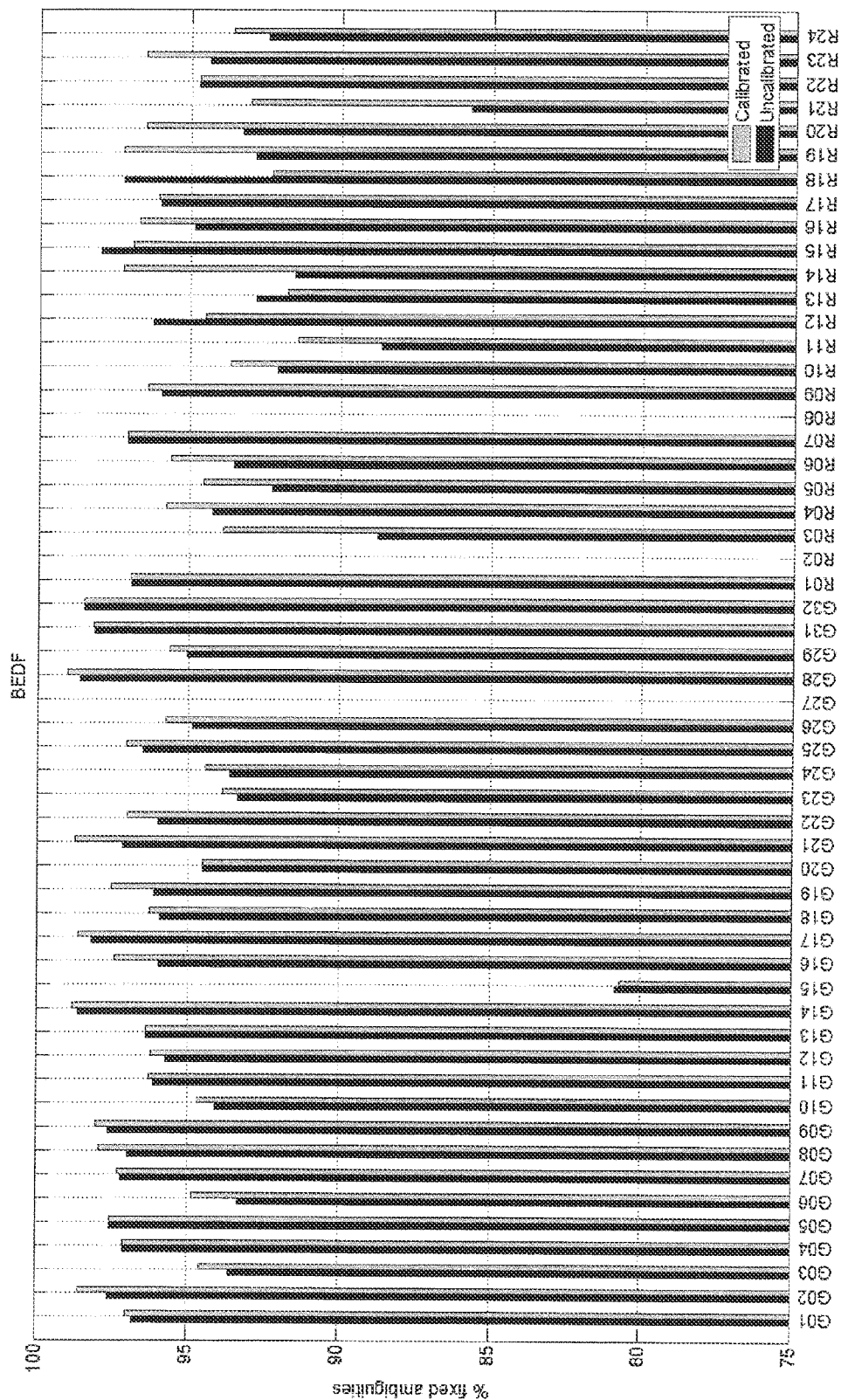
FIG. 6 shows the ambiguity fixing performance improvement for BEDF station on day of the year 319, 2013.
Figure 7:
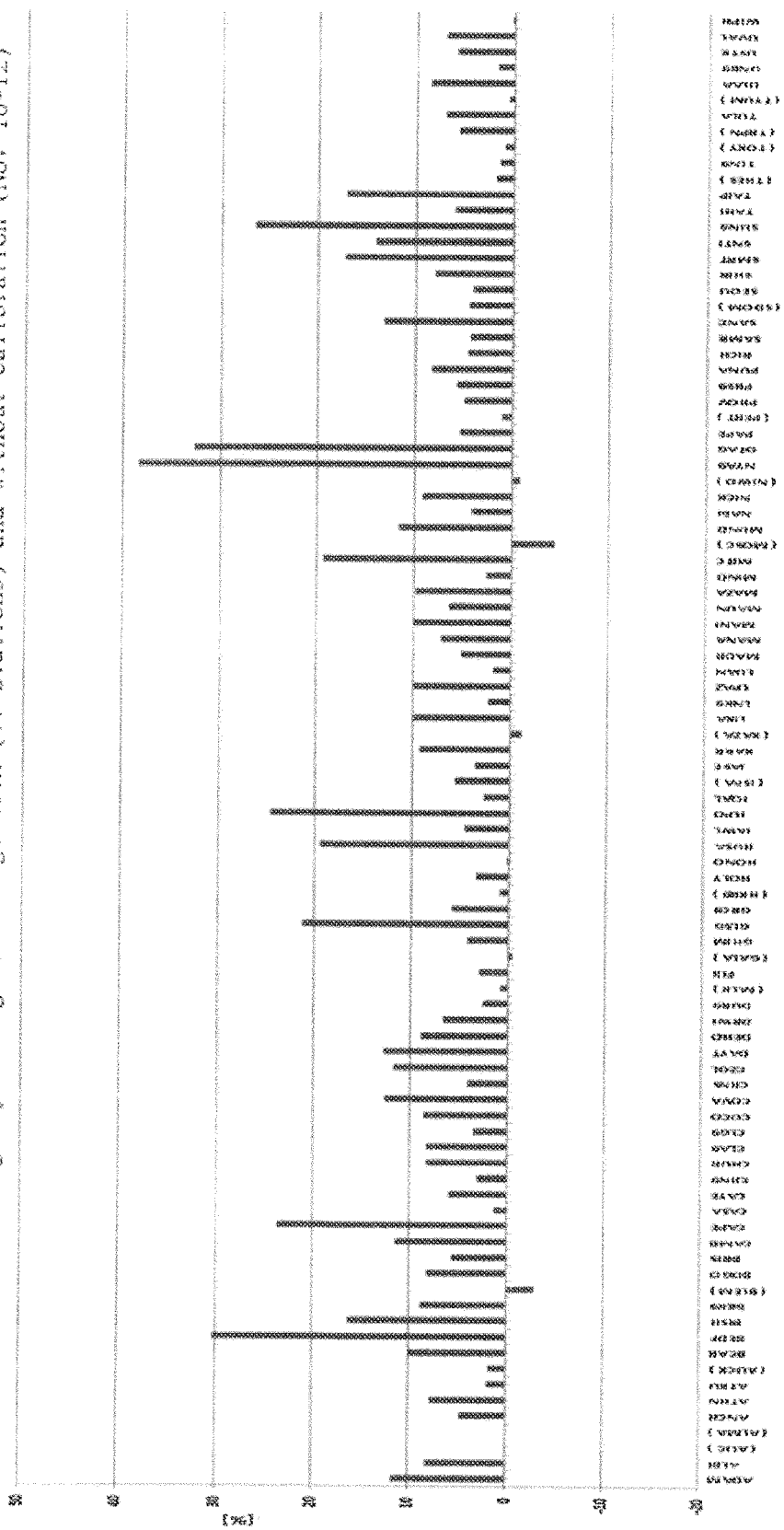
FIG. 7 shows the wide-lane ambiguity fixing improvement for many network station identity codes using the "ambiguity fixing rate" (as a percentage) performance metric based on the Melbourne-Wübbena combination with receiver code bias calibration compared to a situation without additional calibration (i.e., in addition to the calibration values typically shipped with the receiver)
Figure 8:
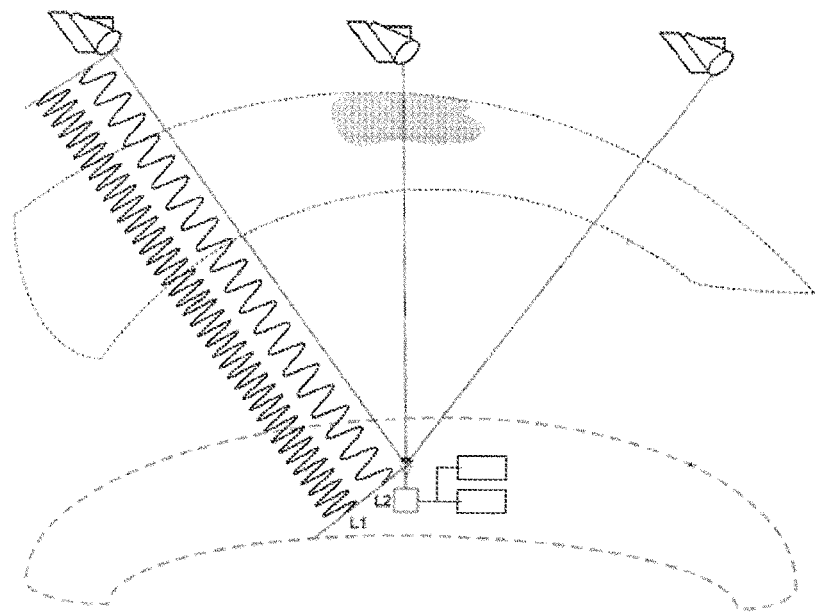
FIG. 8 shows a zero-baseline setup for the estimation of the receiver code biases per satellite, wherein two receivers are physically connected to the same antenna, and wherein common mode effects due to antenna, cable, ionosphere, troposphere and satellite are cancelled out when single differences are computed.
Figure 9:
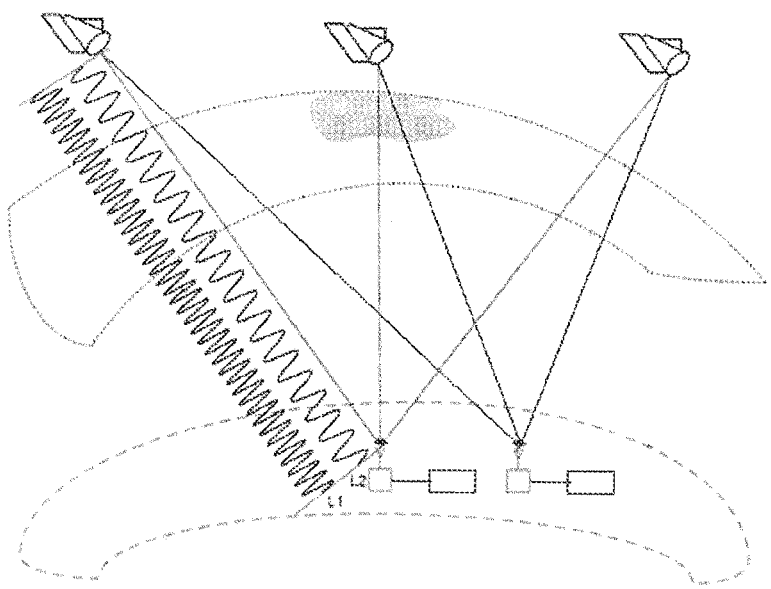
FIG. 9 shows a short-baseline setup for the estimation of the receiver code biases per satellite, wherein two receivers are connected to different antennae, and wherein satellite biases and clock errors are cancelled out, antenna and cable are not cancelled, and ionosphere and troposphere errors are mitigated to a level mostly dictated by the baseline length.

In step s30, ambiguities in the carrier phase of the received raw observations are estimated, using the precise satellite information or the information derived therefrom. In other words, using the raw observations and the precise satellite information (or information derived therefrom), the ambiguities are estimated for each satellite. In one embodiment, the ambiguities are set to integer values and thus regarded as resolved. In particular, when the estimated ambiguities are sufficiently close to integer values (e.g., using a threshold), they are set to integer values. In another embodiment, the ambiguities are estimated and set to real number values (float solution). The threshold can be any small fractional value, for example one tenth of a cycle, that provides an acceptable improvement in the ambiguity fixing performance per satellite as shown in FIG. 6, or in the ambiguity fixing per station as shown in FIG. 7.

In one variant, synthesized base station observations (as for example described in WO 2011/034614 A2, hereinafter referred to as reference [8]) are generated using, i.e. derived from, the precise satellite information, and the synthesized base station observations are then used to estimate the ambiguities. The synthesized base station observations contain the modelled satellite orbit, clock, biases information, and optionally the ionospheric model. Ambiguity resolution is performed with the single difference observations between the received raw observations and the synthesized base station. The ambiguity-reduced observations are generated after ambiguity fixing, by reconstructing the undifferenced ambiguities from the double-difference ambiguities. As a result, in the ambiguity-reduced observations, the phase carrier observations are levelled to a single ambiguity value for every satellite. Ambiguity resolution is, in principle, not mandatory for the described algorithm. Anyway, any kind of optimization correctly exploiting the integer nature of the ambiguities positively affects the estimation of the receiver code biases.

In step s40, combination values are computed based on the received raw observations together with the estimated ambiguities (in one embodiment, those are resolved integer ambiguities, as explained above), to cancel out the effects of the satellite motion relative to the at least one NSS receiver (i.e., the effects of what is known in the art as the "geometry"), the effects of the clocks (i.e., the clocks of both the receiver and the satellite), the effects of the troposphere, and the effects of the ionosphere. In one embodiment, the computation s40 implies that, for each satellite and epoch, the multipath combination for L1 and L2 is computed, using code and phase observations after having performed ambiguity estimation (ambiguity-reduced phase observations), or, in one embodiment, after having performed ambiguity resolution. For each satellite and epoch, the multipath combination for L1 and L2 is computed, using code and phase synthesized base station observations, i.e. from the observables. Then, by subtracting the synthesized base station observations from the ambiguity-reduced observations, single-difference multipath combinations are computed (see equations (19) and (20) below). In particular, (i) the multipath combination cancels out the effects of the geometry, the ionosphere and the troposphere delays, (ii) subtracting the synthesized base station observations leads to cancelling out the satellite biases and clock errors using the information provided by the correction stream, and (iii) then, using the ambiguity-reduced observations, the ambiguity parameters are cancelled out.

The multipath combination may constitute the input data to the estimation process. The observation equations are solved through a least-squares estimation technique for one common parameter (the common clock) and n (per satellite) biases for each frequency band. The corresponding normal equation system has a rank defect of one (because the columns of the design matrix are linearly dependent), which is usually solved by imposing a zero mean constraint on the bias estimates.

In step s50, the correction information is generated per satellite, based on the computed combination values. The correction information may for example be generated per satellite and frequency (e.g. L1/L2) and/or per satellite and linear combination of frequencies (e.g. ionosphere-free/ ionosphere), based on the computed combination values.

The correction information comprises, in one embodiment, the receiver code biases that compromised the ability of GNSS receivers to provide accurate position information (or at least compromised the ease with which GNSS receivers are able to provide accurate position information). The correction information constitutes the output of, or at least a portion of the output of, the calibration process.

The correction information may be generated once and then becomes applicable to a plurality of receivers of the same or a similar type, i.e., having the same or a similar hardware/firmware, the same or a similar antenna cable, and the same or a similar antenna. The correction information is used for determining the position, or determining a change in the position, of the NSS receiver(s). In one embodiment, the L1/L2 receiver code biases per satellite, i.e. the correction information, are estimated as well as a common clock parameter for all the observed satellites. A least-squares estimation method is used with a zero mean constraint over all satellites within a satellite system for a specific frequency band (see equation (21) below). However, various other methods providing estimates of the satellites biases and the integer ambiguity may be used for the receiver code bias calibration.

The correction information may for example be in the form of calibration values and/or a calibration table. The correction information may then be (a) directly used by the NSS receiver and/or (b) sent to a receiver of the same or similar type and then used by this receiver. The calibration values may then be stored in the NSS receiver and subtracted from the code observations.

As mentioned above, the prior art approaches are typically suitable for receiver type specific code biases calibration and require physical receiver(s) as reference receiver(s). In order to overcome the need for using a physical receiver for the calibration, the method of FIG. 1a uses precise satellite information, or information derived therefrom, for example in the form of a data stream provided by a system comprising a network of reference stations, to define a virtual reference receiver. In such a way, every receiver having access to the precise satellite information, or the information derived therefrom, can be calibrated without zero- or short-baseline setup. Various different types, and/or formats, of precise satellite information, or information derived therefrom, may be used in the calibration process, such as for example as described in U.S. Pat. No. 8,018,377 B2 (hereinafter referred to as "reference [5]"). In such an approach, the global tracking network is used as the reference to calibrate the receiver code bias. In contrast to the zero- and short-baseline techniques, site-specific effects due to the antenna and/or cable are implicitly accounted for.

The method may be used to better calibrate reference stations (thus allowing improvements to the information and models generated based on observations obtained at these reference stations) and/or to better calibrate rover receivers (leading to a faster convergence and a more accurate positioning process).

In one embodiment, receiving s10 raw observations obtained by one of the NSS receiver(s) observing NSS multiple frequency signals from a plurality of NSS satellites occurs over at least one day, as one day is generally required to observe all the satellites. This requirement may be however relaxed for a regional system, and in such a case the zero mean constraint may be modified as well. Namely, it is not needed to define the zero mean constraint for the whole set of observed satellites. Defining the zero mean constraint for a subset of the observed satellite (or just one), is enough to solve the rank defect.

In one embodiment, receiving s10 raw observations obtained by one of the NSS receiver(s) observing NSS multiple frequency signals from a plurality of NSS satellites occurs over a sufficiently long period of time to be able to observe a given number of satellites.

In one embodiment, when obtaining the precise satellite information, information on: (iv) a precise ionosphere model, is also obtained.

In one embodiment, when obtaining the precise satellite information, information on: (v) a precise troposphere model, is also obtained.

The term "precise" in "precise ionosphere model" and "precise troposphere model" means, in one embodiment, sufficiently precise to allow a successful ambiguity resolution. For example, the precision of the ionosphere and troposphere models may be required to be, as a rule of thumb, smaller than 0.25 cycles.

In one embodiment, the step of computing s40 combination values comprises computing multipath combination values of each frequency. In that respect, see for example equations (15) and (16) below.

In one embodiment, step s40 comprises computing ionospheric-free code minus ionospheric-free phase combination values, i.e. subtracting the ionospheric-free phase observations from the ionospheric-free code observations. In that respect, see for example equation (22).

In one embodiment, step s40 comprises computing ionospheric code minus ionospheric phase combination values, i.e. subtracting the ionospheric phase observations from the ionospheric code observations. In that respect, see for example equation (23).

In one embodiment, step s40 comprises computing Melbourne-Wöbbena (MW) combination values. In that respect, see for example equation (26).

In one embodiment, step s40 comprises computing ionospheric-free code minus ionospheric-free phase combination values, and ionospheric code minus ionospheric phase combination values. In that respect, see for example equations (22) and (23).

In one embodiment, step s40 comprises computing ionosphere-free code minus ionosphere-free phase combination values, and MW combination values. In that respect, see for example equations (22) and (26).

In one embodiment, step s40 comprises computing ionospheric code minus ionospheric phase combination values and MW combination values. In that respect, see for example equations (23) and (26).

Such combinations (corresponding, for example, to (i) equations (22) and (23), (ii) equations (22) and (26), and (iii) equations (23) and (26)) are similar to the multipath combination, as it is possible to find a linear transformation between the two sets of combinations (see for example equation (27)). Further, see for example equations (28) to (32) regarding the estimation of the receiver code biases.

In one embodiment, the raw observations include observations for both GPS and GLONASS satellites. In general however, the calibration method according to embodiments of the invention may be applied to any constellation of GNSS satellites. The method is independent of the considered constellation. The method is all the more beneficial as the addressed receiver code biases are bigger, such for example for some GLONASS receivers.

Figure 1B:
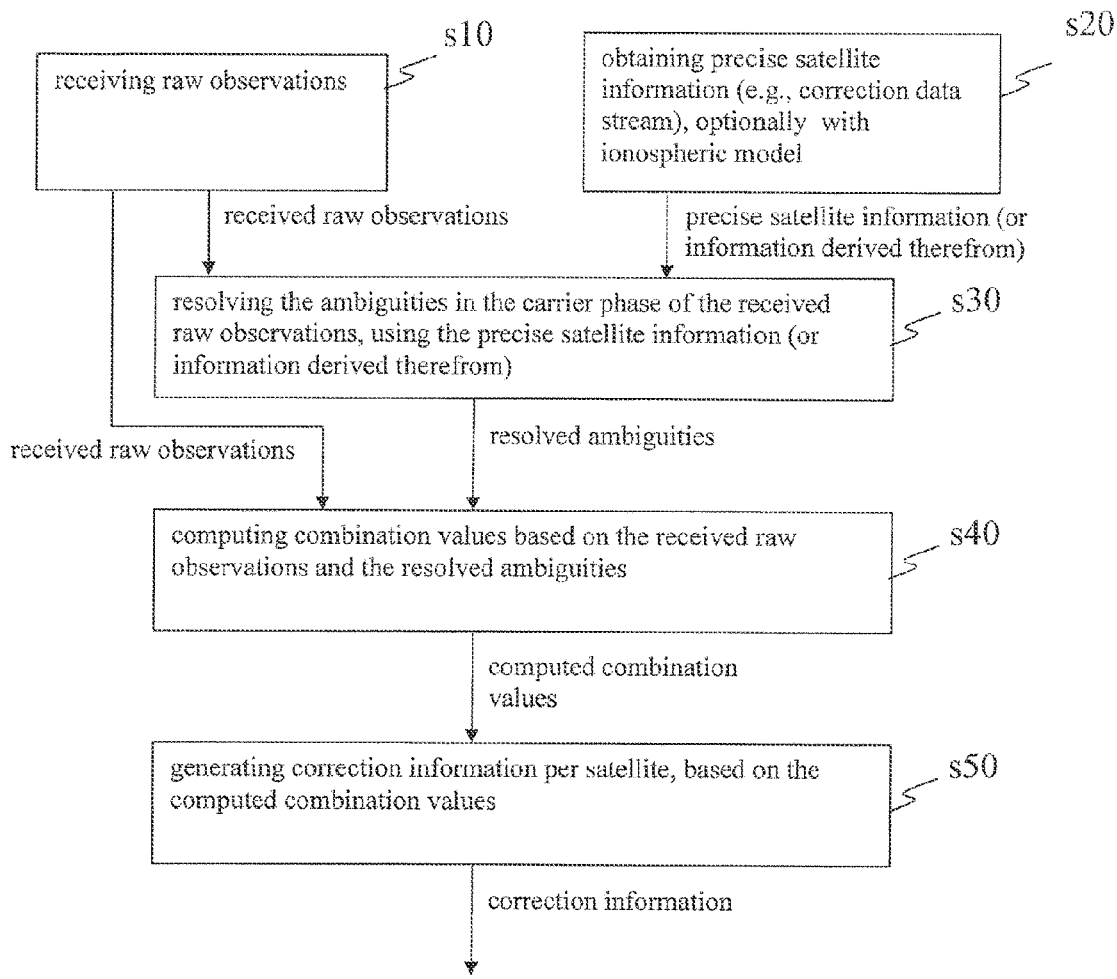
FIG. 1b is a flowchart of a method in one embodiment of the invention, being a more specific embodiment than FIG. 1a in that, in step s30, the ambiguities are set to integer values and thus regarded as resolved.

FIG. 1b is a flowchart of a method in one embodiment of the invention, showing a more specific embodiment than the one described with reference to FIG. 1a in that, in step s30, the ambiguities are set to integer values and thus regarded as resolved. The resolved ambiguities are then used in step s40 for computing the combination values. The considerations discussed with reference to FIG. 1a otherwise also apply to FIG. 1b.

Figure 1C:
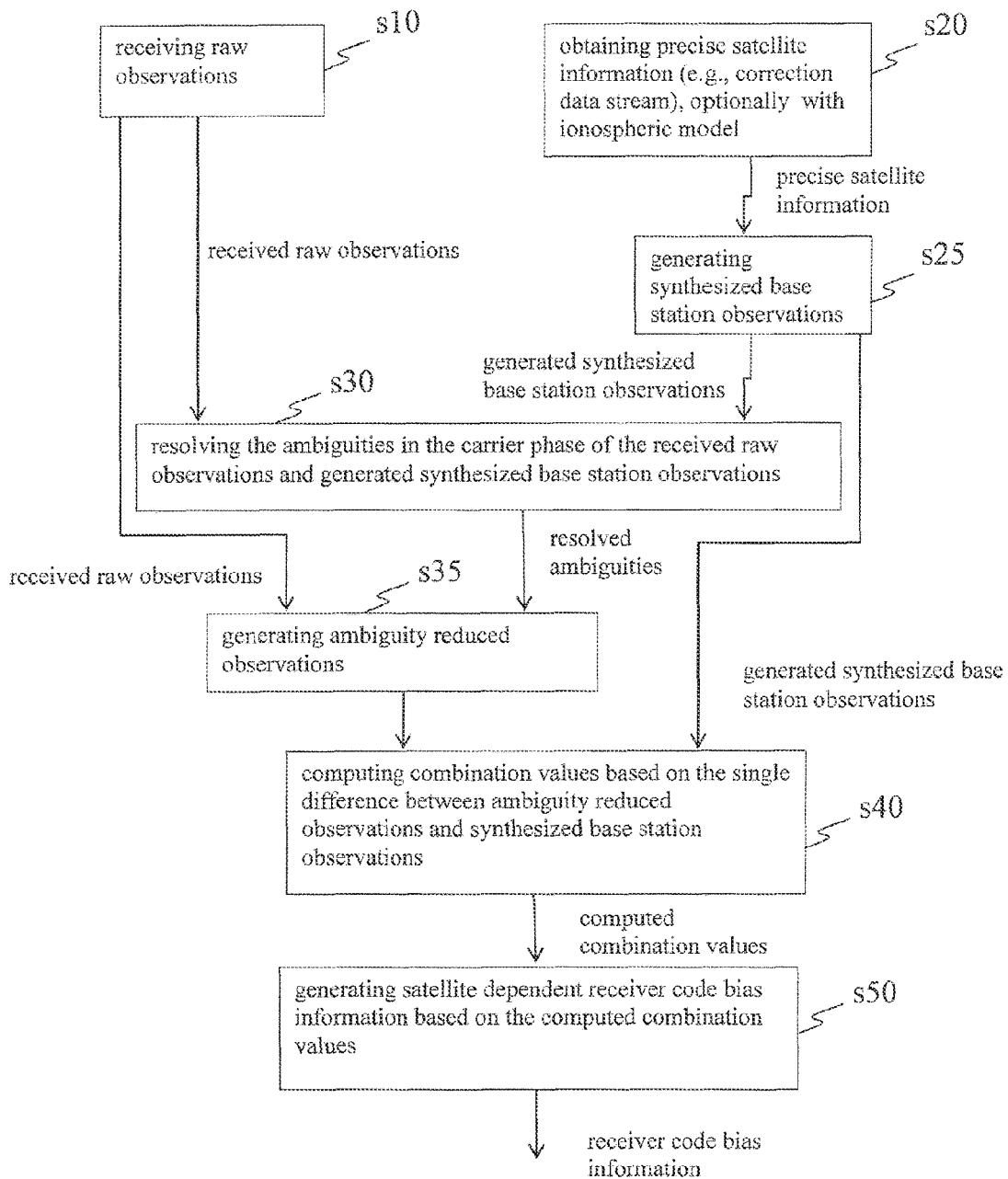
FIG. 1c is a flowchart of a method in one embodiment of the invention, being a more specific embodiment than FIG. 1b in that it involves the generation of synthetized base station observations.

FIG. 1c is a flowchart of a method in one embodiment of the invention, showing a more specific embodiment than the one described with reference to FIG. 1b. Namely, in step s25, the precise satellite information is used to generate, i.e. to derive, synthetized base station observations, which are then used in step s30 to resolve the ambiguities. In step s35, the resolved ambiguities and the received raw observations are used to generate ambiguity reduced observations. The ambiguity reduced observations are phase observations from which the estimated (optimized) ambiguities are subtracted. These ambiguity reduced observations have the property that any double differenced ambiguity computed from them is zero. Then, combination values are computed s40 based on the single difference between the generate ambiguity reduced observations and the synthetized based stations observations. The correction information, such as, in one embodiment, the receiver code bias information per satellite, is then generated s50 based on the computed combination values. The considerations discussed with reference to FIGS. 1a and 1b otherwise apply to FIG. 1c as well.

Let us now further explain the context in which some embodiments of the invention have been developed, for a better understanding thereof. In particular, the zero- and short-baseline calibrations are described in more detail (section A). Then, further embodiments of the invention are also described and discussed (sections B to F), and the performance thereof is discussed (section D).

A. Zero- and Short-baseline Calibration

Zero- and short-baseline calibration requires only code (pseudorange) observations. The code observation between satellite s and receiver r for frequency k (i.e. GPS L1, L2), modulation type m (i.e. GPS L2C, L2P/Y) is modeled as:

$$P_{r,k}^s = \rho_r^s + c\Delta t_r - c\Delta t^s + T_r^s - I_{r,k}^s + B_{r,k}^s - B_k^s + \upsilon_{r,k}^s \quad (1)$$

where:

$\rho_r^s$ is the geometric range of satellite s at signal transmission time and receiver r at signal reception time;

c is the speed of light, $c\Delta t_r$ is the receiver clock error, $c\Delta t^s$ is the satellite clock error;

$T_r^s$ is the tropospheric delay for satellite s, wherein the tropospheric effect is frequency/modulation type independent;

$I_{r,k}^s$ is the ionospheric delay for satellite s at frequency k. The ionospheric effect is frequency dependent. For given two frequencies k1 and k2, $$I_{r,k1}^s = \frac{\lambda_{k1}^2}{\lambda_{k2}^2} I_{r,k2}^s,$$

where $\lambda_{k1}$, $\lambda_{k1}$ are the wavelength for frequency k1 and k2 respectively;

$B_k^s$ is the satellite code bias for frequency k which is caused by satellite hardware delay;

$B_{r,k}^s$ is the receiver code bias per satellite for frequency k. This bias is caused by receiver hardware delay when tracking different satellite signals;

$\upsilon_{r,k}^s$ represents the code noise and multipath.

Modern receivers can track more than one signal (modulation) per frequency, e.g. GPS L1 CA, L1 P/Y for GPS L1 frequency, GPS L2C and L2P/Y for L2 frequency. The modulation type is ignored for simplicity in equation (1) and the following description, which is applicable for any suitable modulation type.

Zero- and short-baseline calibration uses single difference code observations between two receivers. By single differencing, the satellite clock error is cancelled out. For a zero-baseline setup, the troposphere and ionosphere effects are cancelled out totally. For a short-baseline setup which is few meters apart, the residual troposphere and ionosphere effect can be ignored. The single difference code observation between receiver r1 and r2 is modeled as:

$$P_{r1r2,k}^s = \rho_{r1r2}^s + c\Delta t_{r1,r2} + B_{r1r2,k}^s + \upsilon_{r1r2,k}^s \quad (2)$$

where:

$\rho_{r1r2}^s$ is the single difference geometric range, which can be calculated with satellite ephemeris and position of receivers r1 and r2 (for zero-baseline calibration this term is zero);

$c\Delta t_{r1,r2}$ is the single difference receiver clock error;

$B_{r1,r2,k}^s$ is the code bias per satellite between two receivers; and $\upsilon_{r1r2,k}^s$ is the single difference code noise and multipath.

With all observed satellites and multiple epochs of data (preferably more than one day), $B_{r1r2,k}^s$ can be estimated with a least-squares adjustment for one common parameter (the common receiver clock) and n code biases per satellite for each frequency band. The corresponding normal equation system has a rank defect of one which is usually solved by imposing a zero mean condition on the bias estimation (for details, see section "C. Design matrix and zero mean condition") for each signal (e.g., GPS L1CA, L2P/Y, L2C, GLONASS L1CA, L2CA, etc.).

B. Code Bias Calibration with Precise Satellite Orbit/Clock/Bias Information

Both zero- and short-baseline calibration require at least one reference receiver, i.e. dedicated equipment locally arranged near the receiver to be calibrated. The calibrated code bias is relative to the reference receiver(s).

With the precise satellite orbit and clock information (or information derived therefrom) in accordance with one embodiment of the invention, it is possible to calibrate the receiver code biases per satellite without a reference receiver. In other words, the receiver is calibrated against the reference station network which is used to generate the precise satellite orbit and clock information.

Reference [3] describes how to estimate the code biases in ionosphere-free linear combination in precise point positioning (PPP) data processing. Unfortunately, this method cannot estimate code biases for each individual signal. If the troposphere and ionosphere delay can be obtained or estimated, the code biases for each signal can be obtained by equation (1). The accuracy of the estimated code biases depends on the accuracy of orbit and clock, in particular the accuracy of troposphere and ionosphere delay.

Some advanced PPP services provide satellite biases information in addition to precise orbit and clock, which enables the carrier phase ambiguity resolution on the user receiver (see Ge, M, G. Gendt, M. Rothacher, C. Shi, J. Liu, Resolution of GPS carrier phase ambiguities in precise point positioning (PPP) with daily observations, Journal of Geodesy, 2008, hereinafter referred to as reference [6], and Leandro, R., H. Landau, M. Nitschke, M. Glocker, S. Seeger, X. Chen, A, Deking, M. Ben Tahar, F. Zhang, R. Stolz, N. Talbot, G. Lu, K. Ferguson, M. Brandi, V. Gomez Pantoja, A. Kipka (2011) "RTX Positioning: the Next Generation of cm-accurate Real-time GNSS Positioning", Paper presented at ION-GNSS-2011, Sep. 20-23, 2011, Portland, Oreg., USA, hereinafter referred to as reference [7]). The position accuracy of the user receiver can achieve centimeter level accuracy. This enables performing precise receiver code bias calibration without the need of precise troposphere and ionosphere information. The approach uses both code and carrier phase observations and requires ambiguity resolution on the user receiver.

The carrier phase observation can be modeled as:

$$L_{r,k}^s = \rho_r^s + c\Delta t_r - c\Delta t^s + T_r^s + I_{r,k}^s + b_{r,k} - b_{,k}^s + \lambda_k N_{r,k}^s + \epsilon_{r,k}^s \quad (3)$$

where:

$c\Delta t_r$, $c\Delta t^s$ are the receiver and satellite clock error;

$b_{r,k}$, $b_{,k}^s$ are the receiver and satellite phase biases respectively;

$\lambda_k$ is the wavelength of carrier phase;

$N_{r,k}^s$ is the integer ambiguity; and $\epsilon_{r,k}^s$ is the carrier phase observation noise including multipath.

We see that the clock errors are separated from the satellite phase biases. This holds also for the ionosphere free combination of the phase observations: the ionosphere free receiver and satellite clock errors are separated from the ionosphere free combination of the receiver and satellite biases. Another definition of the clock error can be used, which lumps together the receiver and satellites clocks and the biases. The ionosphere free combination of such redefined clock errors is called phase-leveled clock error. Phase leveled clock error is explained in Part 9 of reference [8]. The phase leveled clock error is computed with ionospheric-free phase observations from a global network and enables the ambiguity fixing with user receiver only. Ionospheric-free phase observations can be built if phase observations are available from at least two frequencies. For example, the L1, L2 ionospheric-free phase observation can be written as:

$$L_{IF_r}^s = \frac{\lambda_2^2}{\lambda_2^2 - \lambda_1^2} L_{r,1}^s - \frac{\lambda_1^2}{\lambda_2^2 - \lambda_1^2} L_{r,2}^s = \rho_r^s + c\delta t_r - c\delta t^s + T_r^s + N_{C_r}^s + \epsilon_C \quad (4)$$

where the ionosphere free combination of the receiver and satellite phase biases are lumped up into the phase leveled clock error, $$c\delta t_r = c\Delta t_r + b_{r,C} \text{ and } c\delta t^2 = c\Delta t^s + b_{,C}^s \quad (5)$$

$$b_{r,C} = \frac{\lambda_2^2}{\lambda_2^2 - \lambda_1^2} b_{r,1} - \frac{\lambda_1^2}{\lambda_2^2 - \lambda_1^2} b_{r,2} \text{ and} \quad (6)$$

$$b_{,C}^s = \frac{\lambda_2^2}{\lambda_2^2 - \lambda_1^2} b_{,1}^s - \frac{\lambda_1^2}{\lambda_2^2 - \lambda_1^2} b_{,2}^s$$

$$N_{C_r}^s = \frac{\lambda_1 \lambda_2^2}{\lambda_2^2 - \lambda_1^2} N_{r,1}^s - \frac{\lambda_1^2 \lambda_2}{\lambda_2^2 - \lambda_1^2} N_{r,2}^s \quad (7)$$

$\lambda_1, \lambda_2$ are the wavelength for L1 and L2, respectively, and $N_{r,1}^s$, $N_{r,2}^s$ are the integer ambiguity for L1 and L2, respectively. $\epsilon_C$ is the carrier phase noise in ionospheric free phase combination. The ionosphere free ambiguity is expressed in linear units.

The phase leveled clock error is not unique. Depending on how the ambiguity is resolved and leveled, phase leveled clock error can be shifted by a combination of integer number of N1 and N2 ambiguity defined by equation (7). The effect is common to all satellites in the same satellite system and thus absorbed by the receiver clock term.

And the L1/L2 ionospheric phase combination (mapped to frequency L1) can be written as:

$$L_{I_{r,1}^s} = -\frac{\lambda_1^2}{\lambda_2^2 - \lambda_1^2}(L_{r,1}^s - L_{r,2}^s) = I_{r,1}^s + b_{r,I} - b_{,I}^s + N_{I_r}^s + \epsilon_I \quad (8)$$

where:

$$b_{r,I} = \frac{\lambda_1^2}{\lambda_2^2 - \lambda_1^2}(b_{r,2} - b_{r,1}) \text{ and } b_{,I}^s = \frac{\lambda_1^2}{\lambda_2^2 - \lambda_1^2}(b_2^s - b_1^s) \quad (9)$$

$$N_{I_r}^s = -\frac{\lambda_1^3}{\lambda_2^2 - \lambda_1^2} N_{r,1}^s + \frac{\lambda_1^2 \lambda_2}{\lambda_2^2 - \lambda_1^2} N_{r,2}^s \quad (10)$$

$b_{r,I}$ and $b_{,I}^s$ are the ionospheric phase bias for receiver and satellite, respectively. $\epsilon_I$ is the carrier phase noise in ionospheric phase combination.

In PPP server process, the satellite clock error is estimated based on ionospheric-free code observations, so that the estimated satellite clock error is so-called code leveled clock (Part 6 of reference [8]) (this satellite clock error is estimated through the ionosphere-free code combination, hence it also contains the ionosphere-free combination of the satellite code biases). The code leveled clock is defined as the satellite clock error plus the ionospheric-free satellite code bias (this clock error is the sum of two parts which have different behaviour in time: the clock part is rapidly changing whereas the second is almost constant in time):

$$cdt^s = c\Delta t^s + \frac{\lambda_2^2}{\lambda_2^2 - \lambda_1^2} B_{,1}^s - \frac{\lambda_1^2}{\lambda_2^2 - \lambda_1^2} B_{,2}^s \quad (11)$$

Another satellite bias is the satellite Differential Code Bias (DCB), which is the difference of code bias between two signals. The L2-L1 satellite DCB is defined as:

$$B_I^s = B_{,2}^s - B_{,1}^s \quad (12)$$

From equations (11) and (12), the following relationships can be derived:

$$c\Delta t^s + B_{,1}^s = cdt^s + \frac{\lambda_1^2}{\lambda_2^2 - \lambda_1^2} B_I^s \quad (13)$$

and $$c\Delta t^s + B_{,2}^s = cdt^s + \frac{\lambda_2^2}{\lambda_2^2 - \lambda_1^2} B_I^s \quad (14)$$

With equations (1), (4), and (8), a special code phase combination can be built, which is geometry-free and ionosphere-free. This combination is the so-called multipath combination, it is also called the divergence free combination. Further considering equations (11) and (12), L1 and L2 multipath combination can be written as:

$$mp_{r,1}^s = P_{r,1}^s - L_{IF_r}^s + L_{I_{r,1}^s} \quad (15)$$

$$= (c\delta t^s - cdt^s) - \left(\frac{\lambda_1^2}{\lambda_2^2 - \lambda_1^2} B_I^s + b_I^s\right) - (N_{C_r}^s - N_{I_r}^s) +$$

$$(c\Delta t_r - c\delta t_r + b_{r,I}) + B_{r,1}^s + \epsilon_{mp1}$$

-continued $$mp_{r,2}^s = P_{r,2}^s - L_{IF_r^s} + \frac{\lambda_2^2}{\lambda_1^2} L_{I_{r,1}}^s \quad (16)$$

$$= (c\delta t^s - cdt^s) - \left(\frac{\lambda_2^2}{\lambda_2^2 - \lambda_1^2} B_I^s + \frac{\lambda_2^2}{\lambda_1^2} b_I^s\right) -$$

$$\left(N_{c_r}^s - \frac{\lambda_2^2}{\lambda_1^2} N_{I_r}^s\right) + \left(c\Delta t_r - c\delta t_r - + \frac{\lambda_2^2}{\lambda_1^2} b_{r,I}\right) +$$

$$B_{r,2}^s + \varepsilon_{mp2}$$

In equations (15) and (16), the first pair of brackets contains the difference of phase leveled and code leveled satellite clock error; the second pair of brackets contains the satellite DCB and satellite ionospheric phase bias term; the third pair of brackets contains the ionospheric-free and ionospheric ambiguity term; and the fourth pair of brackets contains the receiver clock error and ionospheric receiver phase bias term, this term being the same for all satellites within one satellite system, so that it can be eliminated epoch by epoch in a least-squares adjustment. $\varepsilon_{mp1}$ and $\varepsilon_{mp2}$ are the noise in L1 and L2 multipath combination.

Assuming that a PPP service provides the difference between code leveled and phase leveled satellite clock error, satellite DCB and ionospheric phase bias, and the ambiguities of the user receiver can be resolved with the PPP server correction data, the receiver code bias per satellite for L1 and L2 can be estimated by using multiple epochs data with the method described in section "C. Design matrix and zero mean condition".

Moreover, according to equation (18) of US2013/0044026 A1 (hereinafter referred to as reference [9]), satellite MW bias can be used to replace satellite DCB if the PPP service provides the difference between code and phase clock, and it also provides the ionospheric phase bias (this is because there is a linear relationship between the DCB and the MW phase biases).

Another variant is to generate synthetic reference data with the PPP server correction data as described in reference [9]. Further forming L1 and L2 multipath combination as following:

$$mp_{GVRS_{r,1}}^s = (c\delta t^s - cdt^s) - \left(\frac{\lambda_1^2}{\lambda_2^2 - \lambda_1^2} B_I^s + b_I^s\right) \quad (17)$$

$$mp_{GVRS_{r,2}}^s = (c\delta t^s - cdt^s) - \left(\frac{\lambda_2^2}{\lambda_2^2 - \lambda_1^2} B_I^s + \frac{\lambda_2^2}{\lambda_1^2} b_I^s\right) \quad (18)$$

Differencing between the multipath combination of user receiver and synthetic reference data, $$mp_{r,1}^s - mp_{GVRS_{r,1}}^s = -(N_{c_r}^s - N_{I_r}^s) + (c\Delta t_r - c\delta t_r + b_{r,I}) + B_{r,1}^s + \varepsilon_{mp1} \quad (19)$$

$$mp_{r,2}^s - mp_{GVRS_{r,2}}^s = \quad (20)$$

$$-\left(N_{c_r}^s - \frac{\lambda_2^2}{\lambda_1^2} N_{I_r}^s\right) + \left(c\Delta t_r - c\delta t_r + \frac{\lambda_2^2}{\lambda_1^2} b_{r,I}\right) + B_{r,2}^s + \varepsilon_{mp2}$$

With the integer ambiguity of the user receiver resolved, the receiver code bias per satellite for L1 and L2 can be estimated.

The above-described method uses multipath combination to estimate the code biases per satellite for each signal directly. It is also possible to estimate the code biases for combinations of code observations, i.e. ionospheric free code bias, ionospheric code bias, narrowlane bias, etc.

The ionospheric-free code observation of L1 and L2 code can be written as:

$$P_{IF_r}^s = \frac{\lambda_2^2}{\lambda_2^2 - \lambda_1^2} P_{r,1}^s - \frac{\lambda_1^2}{\lambda_2^2 - \lambda_1^2} P_{r,2}^s = \rho_r^s + c\Delta t_r - cdt^s + T_r^s + B_{r,C}^s + v_{r,C}^s \quad (21)$$

By subtracting equation (4) from equation (21), we get:

$$P_{IF_r}^s - L_{IF_r}^s = (c\delta t^s - cdt^s) - N_{C_r}^s + (c\Delta t_r - c\delta t_r) + B_{r,C}^s + v_{r,C}^s - \varepsilon_{r,C}^s \quad (22)$$

With estimated ionospheric-free ambiguity and the satellite code and phase leveled clock obtained from a PPP service, the ionospheric-free code bias per satellite can be estimated. This bias is useful to reduce the positioning error when the NSS receiver uses ionospheric free code and phase observations to calculate the position.

The receiver ionospheric code bias per satellite can be derived in similar way. The ionospheric code observation of L1 and L2 code is used by subtracting the ionospheric phase observation from the ionospheric code observation:

$$\underbrace{P_{I_r^s}}_{=P_{r,2}^s - P_{r,1}^s} - \frac{\lambda_2^2 - \lambda_1^2}{\lambda_1^2} L_{I_{r,1}}^s = B_{r,I}^s - \left(B_I^s - \frac{\lambda_2^2 - \lambda_1^2}{\lambda_1^2} b_I^s\right) - \quad (23)$$

$$\frac{\lambda_2^2 - \lambda_1^2}{\lambda_1^2} b_{r,I} - \frac{\lambda_2^2 - \lambda_1^2}{\lambda_1^2} N_{r,I}^s + \left(v_{r,I}^s - \frac{\lambda_2^2 - \lambda_1^2}{\lambda_1^2} \varepsilon_I\right)$$

With estimated ionospheric ambiguity, the satellite DCB and ionospheric phase bias obtained from a PPP service, the receiver ionospheric code bias per satellite can be estimated.

Furthermore, the narrowlane code bias can be derived from the narrowlane code observations minus widelane phase observations (Melbourne-Wübbena (MW) combination). The narrowlane code for L1/L2 frequency is:

$$P_{NL_r}^s = \frac{\lambda_1 \lambda_2}{\lambda_1 + \lambda_2} \left(\frac{P_{r,1}^s}{\lambda_1} + \frac{P_{r,2}^s}{\lambda_2}\right) = \quad (24)$$

$$\rho_r^s + c\Delta t_r - cdt^s + T_r^s - \lambda_1 I_{r,1}^s + B_{r,NL}^s - B_{NL}^s + v_{NL_r}^s$$

where $B_{r,NL}^s$ and $B_{NL}^s$ are the narrow-lane combinations of the receiver code bias per satellite and the satellite code bias, respectively. $v_{NL_r}^s$ is the code noise in narrowlane code combination. And widelane phase is:

$$L_{WL_r}^s = \frac{\lambda_1 \lambda_2}{\lambda_1 + \lambda_2} \left(\frac{L_{r,1}^s}{\lambda_1} - \frac{L_{r,2}^s}{\lambda_2}\right) = \rho_r^s + c\Delta t_r - cdt^s + T_r^s - \quad (25)$$

$$\lambda_1 I_{r,1}^s + b_{WL_r} - b_{WL}^s + \frac{\lambda_1 \lambda_2}{\lambda_1 + \lambda_2}(N_{r,1}^s - N_{r,2}^s) + \varepsilon_{WL_T}^s$$

where $b_{WL_r}$ and $b_{WL}^s$ are the wide-lane combinations of the receiver and satellite phase bias, respectively. $\varepsilon_{WL_r}^s$ is the carrier phase noise in widelane phase combination.

By subtracting the wide-lane phase from the narrow-lane code, we get:

$$P_{NL_r}^s - L_{WL_r}^s = \quad (26)$$

-continued $$B_{r,NL}^s - b_{WL_r} - \underbrace{(B_{NL}^s - b_{WL}^s)}_{=B_{MW}^s} - \frac{\lambda_1\lambda_2}{\lambda_1+\lambda_2}\underbrace{(N_{r,1}^s - N_{r,2}^s)}_{=N_{WL_r}^s} + v_{NL_r}^s - \varepsilon_{WL_r}^s$$

In equation (26), the term in the first pair of brackets on the right-hand side of the equation represents the satellite Melbourne-Wübbena (MW) bias, see Part 7 of reference [8]. By using the estimated widelane ambiguity $N_{WL_r}^s$, satellite MW bias $B_{MW}^s$ from a PPP service and, assuming that the receiver widelane phase bias $b_{WL_r}$ has the same value for all satellites in a given satellite system (i.e. in a given satellite constellation, such as for example in the GPS or in the GLONASS satellite system) for each epoch, the receiver narrowlane code bias per satellite can be estimated. This narrowlane code bias is useful to solve the widelane ambiguity for a NSS receiver and/or is helpful to resolve the ionospheric-free ambiguity.

With the estimated code bias combination (equations (22), (23) and (26)), the code bias of each signal can be derived with two code bias combination via a linear relationship. The linear relationships of the biases are:

$$\begin{cases} B_{r,C}^s = \frac{\lambda_2^2}{\lambda_2^2-\lambda_1^2}B_{r,1}^s - \frac{\lambda_1^2}{\lambda_2^2-\lambda_1^2}B_{r,2}^s \\ B_{r,I}^s = B_{r,1}^s - B_{r,2}^s \\ B_{r,NL}^s = \frac{\lambda_2}{\lambda_1+\lambda_2}B_{r,1}^s + \frac{\lambda_1}{\lambda_1+\lambda_2}B_{r,2}^s \end{cases} \quad (27)$$

The code bias combinations that may be used for such purpose are, in three embodiments respectively:

1) Ionosphere free and ionosphere code bias. In that respect, see for example equations (22) and (23).
2) Ionosphere free and narrow lane code bias. In that respect, see for example equations (22) and (26).
3) Narrow lane and ionosphere code bias. In that respect, see for example equations (23) and (26).

C. Design Matrix and Zero Mean Condition

From the previous sections, it can be noted that the observation equations related to different frequencies are decoupled. Hence, it is possible to resolve each of the associated least squares problems separately. For each of them, the design matrix has the following form:

$$A = \begin{bmatrix} I_n & e_n \\ \vdots & & \ddots \\ I_n & & e_n \end{bmatrix} \quad (28)$$

where $I_n$ is the identity matrix, n is the number of satellites observed and $e_n$ is a n-by-1 column matrix the entries of which are 1's. The matrix A has a rank defect of 1. In order to invert the matrix A, an additional constraint equation must be added. The constraint equation reads as:

$$C = [e_n^T 0_{1,k}] = 0. \quad (29)$$

where $0_{1,k}$ is a 1-by-k row matrix of 0's, k is the number of epochs. The choice of the constraint equation may be different (for example, it is possible to just fix the bias value of one satellite to a given value, or the common clock at an arbitrary epoch.) The constrained design matrix $A_C$ is then:

$$A_C = \begin{bmatrix} A \\ C \end{bmatrix}. \quad (30)$$

The normal equations read as:

$$x = (A_C^T W A_C)^{-1} A_C^T W y \quad (31)$$

where x are the estimates of the receiver code biases per satellite, y is the set of observations for the considered frequency, as defined by equations (15) and (16), or equations (19) and (20), or equations (22), (23) and (26) and W is the weight matrix. Such a matrix is diagonal and its elements are defined as:

$$W_i = \left[\frac{\sin\theta_i}{\sigma_i}\right]^2 \quad (32)$$

where $\theta_i$ is the elevation of the i-th satellite and $\sigma_i$ is the code noise at zenith.

D. Performance

The methods and apparatus of the invention involve the generation of correction information, and, in some embodiments, more particularly the generation of receiver code biases per satellite. The performance of some of these embodiments of the invention is discussed in the present section.

Figure 2:
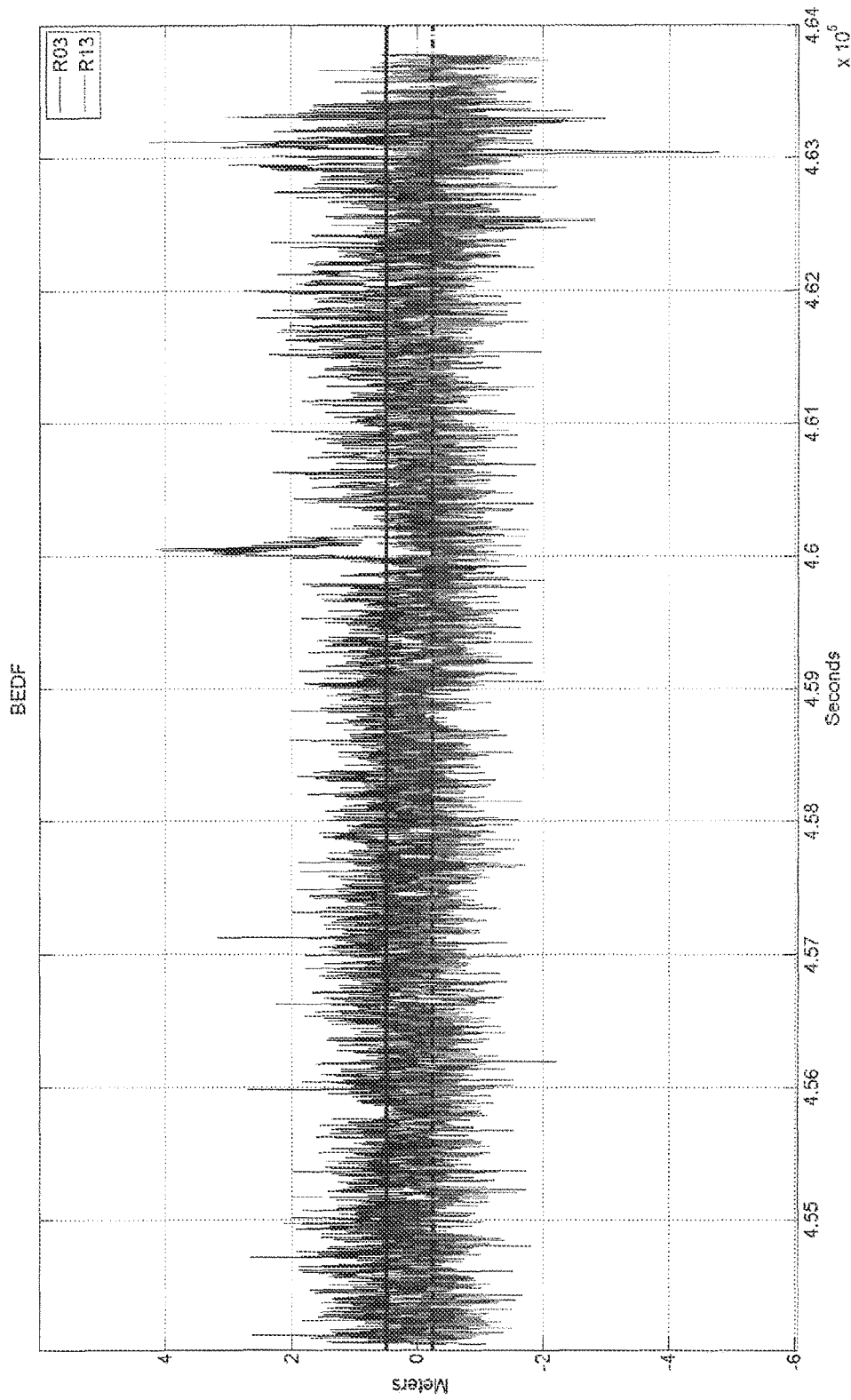
FIG. 2 illustrates the effects of the receiver code biases per satellite on the double-difference residuals of the multipath combination (GLONASS, L1CA; BEDF station, 15 Nov. 2013), where the mean biases for GLONASS 3 and 13, chosen as examples, are shown as solid and dotted lines.

FIG. 2 illustrates the effects of the receiver code biases per satellite on the double-difference residuals of the multipath combination (GLONASS, L1CA; BEDF station, Nov. 15, 2013), after ambiguity fixing (the BEDF station belongs to a Trimble global network and is located in central U.S. (latitude +40 deg, longitude −95 deg)). The data used has been collected at station BEDF on Nov. 15, 2013. In the figure, X axis represents the GPS time of week in seconds, and Y axis represents the code biases in meter. The double-difference multipath residuals have been computed using GLONASS R22 as reference satellite, and satellites R03 and R13. FIG. 2 thus shows a typical example of code biases of GLONASS satellites R03 and R13 relative to the reference satellite R22 on L1CA signal. The mean value of the multipath combination for the double difference R22-R03 is represented by the solid line, while the same quantity for the double difference R22-R13 is represented by the dashed line. The difference between the mean values points out the presence of a differential receiver code bias between satellite R03 and satellite R13 that reaches 80 cm, A bias of this size always impairs ambiguity resolution.

Figure 3:
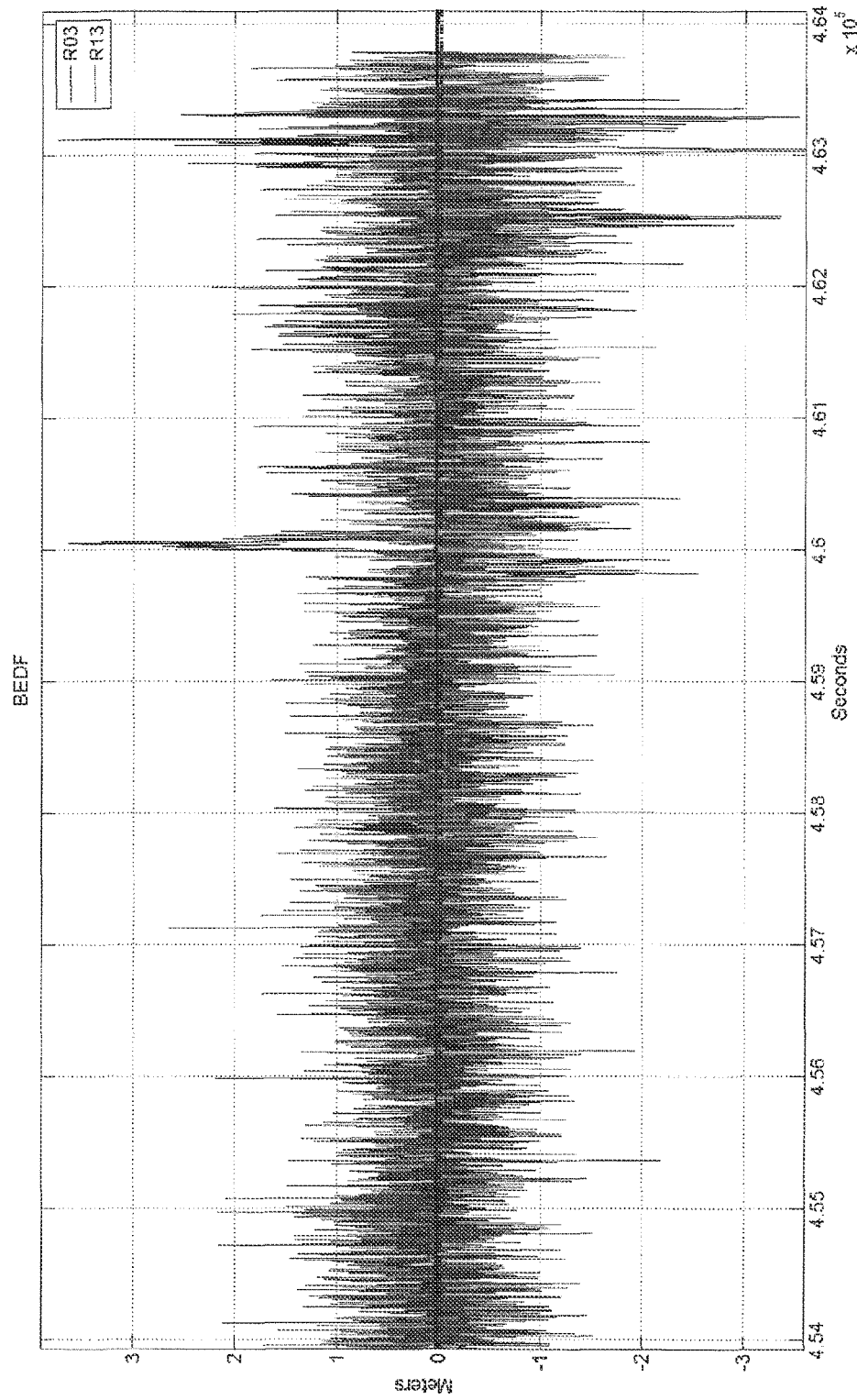
FIG. 3 (with a scale reduced from FIG. 2) illustrates the effects of the receiver code biases per satellite on the double-difference multipath combination (GLONASS, L1CA; BEDF station, 15 Nov. 2013), when a method according to one embodiment of the invention is used, where the mean biases for GLONASS 3 and 13, chosen as examples, are shown as solid and dotted line, and reduced significantly in value.

FIG. 3 shows the receiver code biases for the same satellites as FIG. 2, after having applied the correction information generated in a method according one embodiment of the invention. Compared to FIG. 2, now the bias between the mean values of the double difference multipath R22-R03 and R22-R13 is less than 5 cm. This value is low enough not to affect the performance of the ambiguity resolution. FIGS. 2 and 3 therefore show that, after applying the bias corrections, the residuals are unbiased.

In some embodiments of the invention, correction values are generated which have a similar accuracy as that of the correction values provided by methods requiring dedicated hardware, such for example the above-described zero-baseline calibration. This is illustrated by FIGS. 4 and 5 for the GPS and the GLONASS system, respectively.

Figure 4:
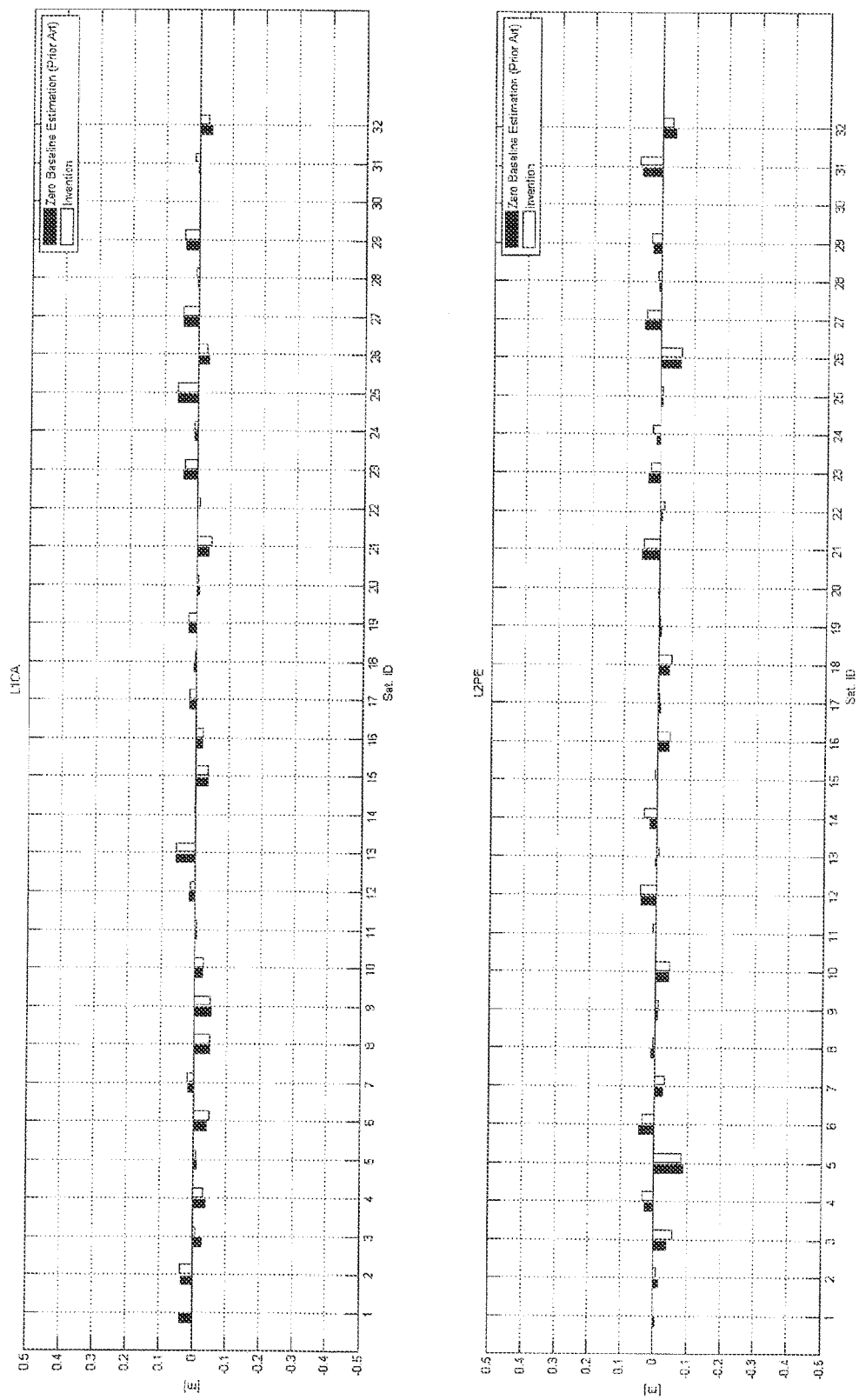
FIG. 4 provides a comparison between the L1CA/L2PE GPS biases in metres estimated by a zero-baseline approach (black bars) and an embodiment of the method of the invention (white bars) (zero-baseline experiment in Höhenkirchen, Germany, day of year 149, 2013), confirming similar values between these methods.
Figure 5:
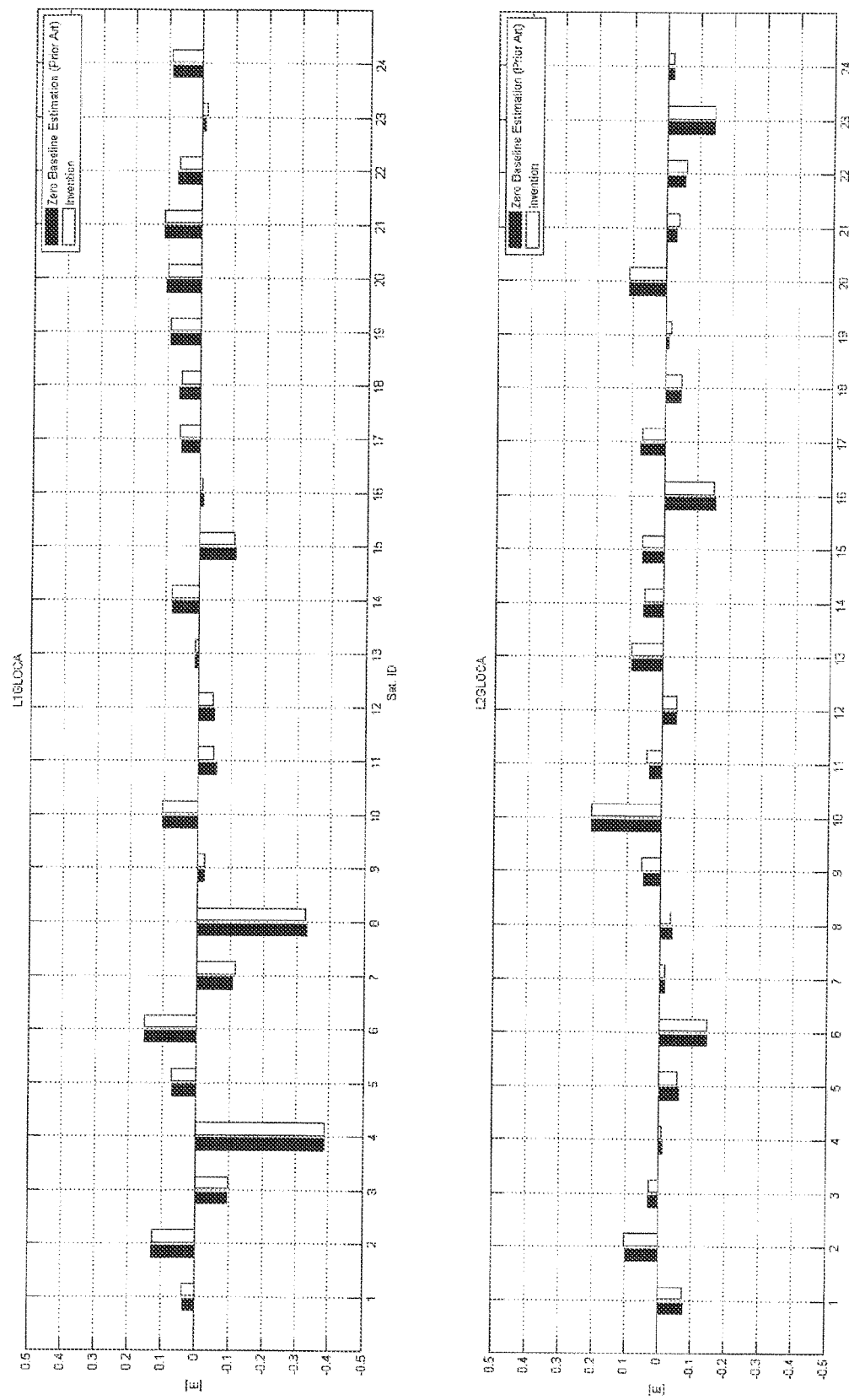
FIG. 5 is the GLONASS counterpart of FIG. 4, i.e.

In FIG. 4, the difference between the receiver code biases values (GPS L1CA/L2PE) estimated for each receiver using a method according to an embodiment of the invention (white bars) is compared to the receiver code bias values estimated using a zero-baseline approach (black bars). The zero-baseline experiment took place in Höhenkirchen, Germany, on day of year (doy) 03, 2014. FIG. 5 shows the same comparison for GLONASS L1CA/L2CA. FIGS. 4 and 5 show that the accuracy of the correction values estimated using a method in one embodiment of the invention are similar to the accuracy of the correction values estimated using the zero-baseline experiment, at the level of 1-2 centimetres at most.

In some embodiments of the invention, the performance of ambiguity resolution is improved. To illustrate the improvement, the percentage of fixed ambiguities per satellite is shown in FIG. 6. The black bars represent the performance for an uncalibrated receiver, while the grey bars show the performance for the same receiver after having applied the corrections estimated in accordance with an embodiment of the invention. This calibration increases the percentage of the fixed GLONASS ambiguities to a level comparable to GPS. In particular, the value is now higher than 90 percent for all the GLONASS satellites. An improvement of a few percent is often enough to drastically shorten the time needed for precise positioning. The dataset was collected by BEDF station (day of year 319, 2013). Satellites G27, G30, R02 and R08 were not present in the considered dataset. Zero value means the corresponding value is not present in the dataset.

In addition, in some embodiments of the invention, the performance of the ambiguity resolution, as indicated by the "ambiguity fixing rate" (as a percentage) performance metric, is improved for a network of world-wide distributed reference stations (in accordance, for example, with US 2012/0163419 A1). The improvement is measured by the differences in the ambiguity fixing rate per station, between the calibrated and uncalibrated cases, as shown in FIG. 7. The improvement due to receiver code bias calibration is represented by positive values. Negative values correspond to the stations for which the biases are not corrected (indicated by brackets on the x-axis). The dataset was collected on Nov. 10-12, 2013. In other words, FIG. 7 shows the difference between the fixing rate obtained by the MW processor after receiver code bias calibration, and before, for the same dataset. The stations showing a worsening, corresponding to a decrease of the fixing ratio, are those for which the biases have not been corrected.

As apparent from what precedes, embodiments of the invention provide calibration values for the receiver code biases per satellite, the quality of which is comparable to the methods using zero-base line calibration, but without requiring a dedicated hardware or physical constraint on the baseline length. The methods may be employed for the calibration of a single receiver as well as the calibration of a network of receivers. Therefore, some embodiments of the invention are well suited for the remote calibration of a large number of worldwide distributed receivers. The method not only estimates the receiver code bias, but also takes into account the inherent bias due to the antenna and cable. Finally, the ambiguity fixing rate is also improved both for a single receiver and a network of receivers.

E. Apparatus

Figure 10:
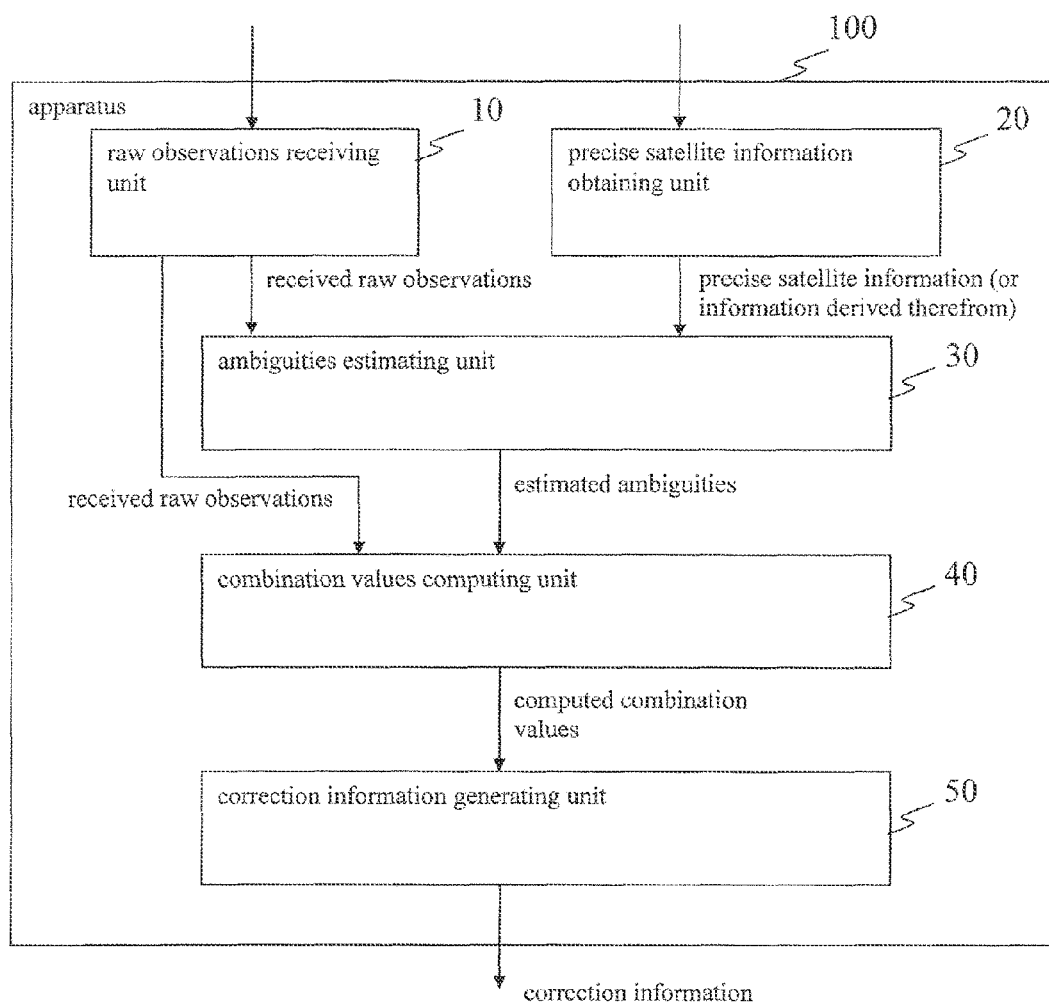
FIG. 10 schematically illustrates an apparatus in one embodiment of the invention.

In one embodiment, schematically illustrated by FIG. 10, an apparatus 100 is provided for generating correction information associated with at least one NSS receiver. The correction information comprises information for correcting pseudorange observations and, as mentioned above, the pseudorange observations useful for determining a position of the at least one NSS receiver. The apparatus 100 comprises fives units.

The raw observations receiving unit 10 is configured for receiving raw observations obtained by one of the at least one NSS receiver observing NSS multiple frequency signals from a plurality of NSS satellites over multiple epochs.

The precise satellite information obtaining unit 20 is configured for obtaining information, hereinafter referred to as "precise satellite information", on: (i) the orbit position of each one of the plurality of NSS satellites, (ii) a clock offset of each one of the plurality of NSS satellites, and (iii) a set of biases associated with each one of the plurality of NSS satellites, or is configured for obtaining information derived from the precise satellite information.

The ambiguities estimating unit 30 is configured for estimating ambiguities in the carrier phase of the received raw observations, using the precise satellite information or the information derived therefrom. In one embodiment, as explained above, the ambiguities are set to integer values, and thus regarded as resolved. In one embodiment, as discussed with reference to FIG. 1c, synthetized base station observations are generated based on, i.e. derived from, the precise satellite information, and the synthetized base station observations are then used in the ambiguities estimating unit 30 to estimate the ambiguities, or, in one embodiment, to resolve the ambiguities to integer values.

The combination values computing unit 40 is configured for computing combination values based on the received raw observations together with the estimated ambiguities, to cancel out the effects of the satellite motion relative to the at least one NSS receiver (i.e. the effects of the geometry), the effects of the clocks, the effects of the troposphere and the effects of the ionosphere.

The correction information generating unit 50 is configured for generating the correction information per satellite and frequency, based on the computed combination values.

In one embodiment, the raw observations receiving unit 10 is configured for receiving raw observations obtained by one of the at least one NSS receiver observing NSS multiple frequency signals from a plurality of NSS satellites over at least one day.

In one embodiment, the precise satellite information obtaining unit 20 is further configured for obtaining information on: (iv) a precise ionosphere model.

In one embodiment, the precise satellite information obtaining unit 20 is further configured for obtaining information on: (v) a precise troposphere model.

In one embodiment, the combination values computing unit 40 is configured for computing multipath combination values of each frequency. In that respect, see for example equations (15) and (16) above.

In one embodiment, the combination values computing unit 40 is configured for computing the ionospheric-free code minus ionospheric-free phase combination values. In that respect, see for example equation (22).

In one embodiment, the combination values computing unit 40 is configured for computing the ionospheric code minus ionospheric phase combination values. In that respect, see for example equation (23).

In one embodiment, the combination values computing unit 40 is configured for computing Melbourne-Wübbena (MW) combination values. In that respect, see for example equation (26).

In one embodiment, the combination values computing unit 40 is configured for computing the ionospheric free code minus ionospheric free phase combination values, and the ionospheric code minus ionospheric phase combination values. In that respect, see for example equations (22) and (23).

In one embodiment, the combination values computing unit 40 is configured for computing the ionospheric free code minus ionospheric free phase combination values, and MW combination values. In that respect, see for example equations (22) and (26).

In one embodiment, the combination values computing unit 40 is configured for computing the ionospheric code minus ionospheric phase combination values, and the MW combination values. In that respect, see for example equations (23) and (26).

Figure 11A:
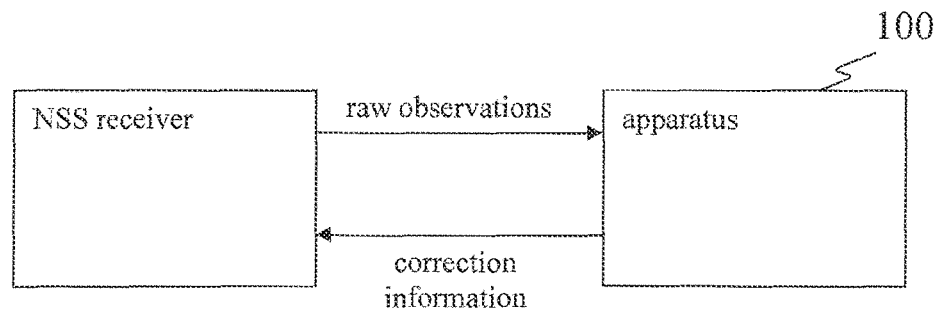

As mentioned above, the apparatus 100 generating the correction information need not necessarily be the NSS receiver initially obtaining the raw observations. In FIG. 11a, a system according to one embodiment of the invention is schematically illustrated wherein a NSS receiver obtains raw observations and transfers those to the apparatus 100. Apparatus 100 then receives the raw observations (i.e., step s10 as described with reference to FIG. 1a) and then, after processing (steps s20 to s50 as described with reference to FIG. 1a), sends the generated correction information to the NSS receiver. In the system of FIG. 11a, the calibration process is therefore performed individually, i.e. on a per receiver basis.

Figure 11B:
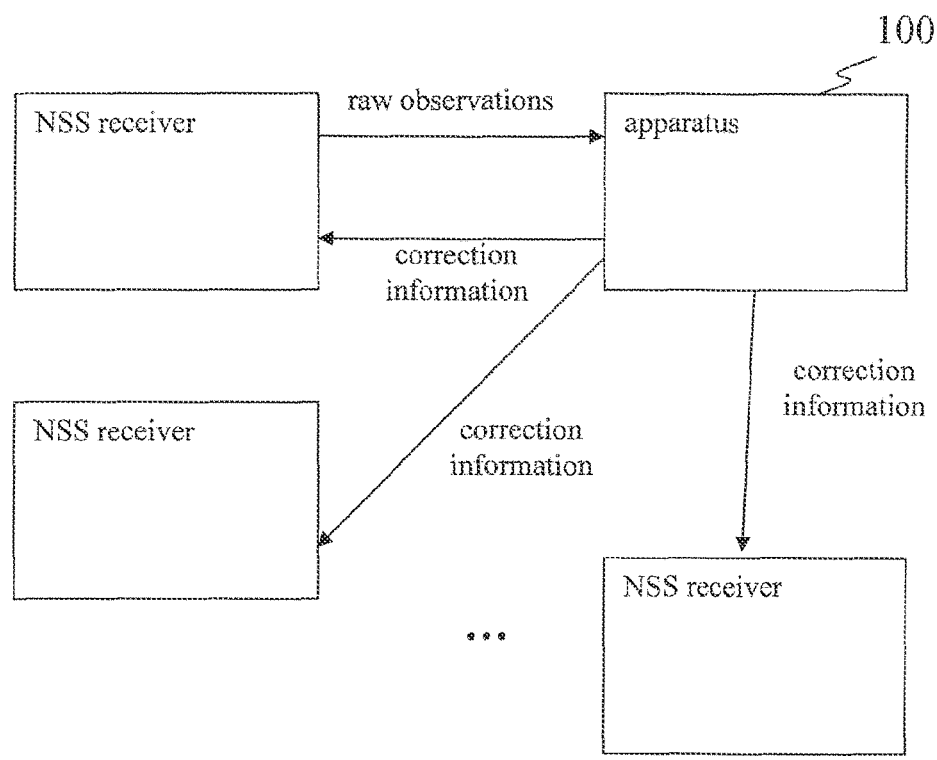

In contrast, FIG. 11b schematically illustrates a system in one embodiment of the invention wherein apparatus 100 broadcasts the generated correction information to more than one NSS receiver (of the same or similar type) based on the raw observations received from one single NSS receiver.

FIG. 11c schematically illustrates a system in one embodiment of the invention, which differs from the system of FIG. 11b in that the generated correction information is not transferred to the NSS receiver from which the raw observations originate.

FIG. 11d schematically illustrates a system in one embodiment of the invention, in which the apparatus 100 generating the correction information is, or is integrated with, the NSS receiver initially obtaining the raw observations. The generated correction information is then broadcast to more than one NSS receiver.

FIG. 11e schematically illustrates a system in one embodiment of the invention, in which the apparatus 100 generating the correction information is, or is integrated with, the NSS receiver initially obtaining the raw observations. The generated correction information is then used by that NSS receiver, without being broadcast to other NSS receivers.

For the sake of conciseness, FIGS. 11a to 11e do not show the precise satellite information (or information derived therefrom) being received by apparatus 100.

For transferring the correction information (as occurring in FIGS. 11a to 11d), any suitable format may be used. Further, the correction information may be transferred, for example, in at least one of: (i) a continuous stream, (ii) together with an update of the receiver firmware and/or software, and (iii) as stored on the receiver at the time of manufacture.

F. Additional Remarks

Any of the above-described methods and their embodiments may be implemented, at least partially, by means of a computer program. The computer program may be loaded on an apparatus, a rover, a receiver or a network station as described above. Therefore, the invention also relates to a computer program, which, when carried out on an apparatus, a rover, a receiver or a network station as described above, carries out any one of the above-described methods and their embodiments.

The invention also relates to a computer-readable medium or a computer-program product including the above-mentioned computer program. The computer-readable medium or computer-program product may for instance be a magnetic tape, an optical memory disk, a magnetic disk, a magneto-optical disk, a CD ROM, a DVD, a CD, a flash memory unit or the like, wherein the computer program is permanently or temporarily stored. The invention also relates to a computer-readable medium (or to a computer-program product) having computer-executable instructions for carrying out any one of the methods of the invention.

The invention also relates to a firmware update adapted to be installed on receivers already in the field, i.e. a computer program which is delivered to the field as a computer program product. This applies to each of the above-described methods and apparatuses.

GNSS receivers may include an antenna, configured to receive the signals at the frequencies broadcasted by the satellites, processor units, one or more accurate clocks (such as crystal oscillators), one or more central processing units (CPU), one or more memory units (RAM, ROM, flash memory, or the like), and a display for displaying position information to a user.

Where the terms "raw observations receiving unit", "precise satellite information obtaining unit", "ambiguities estimating unit", "combination values computing unit", "correction information generating unit" and the like are used herein as units (or sub-units) of an apparatus (such as a GNSS receiver), no restriction is made regarding how distributed the constituent parts of a unit (or sub-unit) may be. That is, the constituent parts of a unit (or sub-unit) may be distributed in different software or hardware components or devices for bringing about the intended function. Furthermore, the units may be gathered together for performing their functions by means of a combined, single unit (or sub-unit).

The above-mentioned units and sub-units may be implemented using hardware, software, a combination of hardware and software, pre-programmed ASICs (application-specific integrated circuit), etc. A unit may include a central processing unit (CPU), a storage unit, input/output (I/O) units, network connection devices, etc.

Although the present invention has been described on the basis of detailed examples, the detailed examples only serve to provide the skilled person with a better understanding, and are not intended to limit the scope of the invention. The scope of the invention is much rather defined by the appended claims.

The invention also relates to the following embodiments E1 to E16:

E1. Method according to any one of the method claims, wherein, when obtaining (s20) the precise satellite information, information on:
(iv) a precise ionosphere model is also obtained.

E2. Method according to any one of the method claims, or embodiment E1, wherein, when obtaining (s20) the precise satellite information, information on:
(v) a precise troposphere model is also obtained.

E3. Apparatus (100) according to claim 12, wherein the raw observations receiving unit (10) is configured for:
receiving raw observations obtained by one of the at least one NSS receiver observing NSS multiple frequency signals from a plurality of NSS satellites over at least one day.

E4. Apparatus (100) according to claim 12 or embodiment E3, wherein the precise satellite information obtaining unit (20) is further configured for obtaining information on:
(iv) a precise ionosphere model.

E5. Apparatus (100) according to claim 12 or embodiments E3 or E4, wherein the precise satellite information obtaining unit (20) is further configured for obtaining information on:
(v) a precise troposphere model.

E6. Apparatus (100) according to claim 12 or any one of embodiments E3 to E5, wherein the ambiguities estimating unit (30) is further configured for setting the ambiguities to integers and resolving them.

E7. Apparatus (100) according to claim 12 or any one of embodiments E3 to E6, wherein the combination values computing unit (40) is configured for computing multipath combination values of each frequency.

E8. Apparatus (100) according to claim 12 or any one of embodiments E3 to E7, wherein the combination values computing unit (40) is configured for computing the ionospheric-free code minus ionospheric-free phase combination values.

E9. Apparatus (100) according to claim 12 or any one of embodiments E3 to E8, wherein the combination values computing unit (40) is configured for computing the ionospheric code minus ionospheric phase combination values.

E10. Apparatus (100) according to claim 12 or any one of embodiments E3 to E9, wherein the combination values computing unit (40) is configured for computing Melbourne-Wübbena combination values.

E11. Apparatus (100) according to claim 12 or any one of embodiments E3 to E10, wherein the combination values computing unit (40) is configured for computing the ionospheric-free code minus ionospheric-free phase combination values, and the ionospheric code minus ionospheric phase combination values.

E12. Apparatus (100) according to claim 12 or any one of embodiments E3 to E11, wherein the combination values computing unit (40) is configured for computing Melbourne-Wübbena combination values and ionosphere-free code minus ionosphere-free phase combination values.

E13. Apparatus (100) according to claim 12 or any one of embodiments E3 to E12, wherein the combination values computing unit (40) is configured for computing the ionospheric code minus ionospheric phase combination values, and the Melbourne-Wübbena combination values.

E14. Apparatus (100) according to claim 12 or any one of embodiments E3 to E13, wherein the correction information generating unit (50) is configured for generating the correction information per satellite and frequency and/or per satellite and linear combination of frequencies, based on the computed combination values.

E15. Computer program product comprising a computer program according to claim 15.

E16. Storage medium storing a computer program according to claim 15.

The invention claimed is:

1. Method for generating correction information associated with a global or regional navigation satellite system (NSS) receiver, wherein the correction information comprises information for correcting pseudorange observations useful for determining a position of the NSS receiver, the correction information comprising estimated receiver code biases per satellite, the method comprising:

receiving first NSS signals using an antenna of the NSS receiver, the first NSS signals comprising multiple frequencies over multiple epochs, the first NSS signals received from a plurality of NSS satellites;

processing the first NSS signals using one or more processors of the NSS receiver to provide first raw observations;

obtaining precise satellite information at the NSS receiver, the precise satellite information comprising:
(i) an orbit position of each one of the plurality of NSS satellites,
(ii) a clock offset of each one of the plurality of NSS satellites, and
(iii) a set of biases associated with each one of the plurality of NSS satellites, or information derived from the precise satellite information;

estimating ambiguities in the carrier phase of the first raw observations using the one or more processors of the NSS receiver, the estimated ambiguities determined based on the precise satellite information or the information derived from the precise satellite information;

computing combination values using the one or more processors of the NSS receiver to provide an observation equation system, the computed combination values determined based on the first raw observations together with the estimated ambiguities, the computed combination values canceling out effects of satellite motion relative to the NSS receiver, effects of satellite clocks, effects of the troposphere, and effects of the ionosphere;

generating the correction information per satellite using the one or more processors of the NSS receiver, the correction information per satellite generated by solving the observation equation system of the computed combination values to estimate the receiver code biases per satellite; thereafter receiving second NSS signals using the antenna of the NSS receiver;

processing the second NSS signals using the one or more processors of the NSS receiver to provide second raw observations;

correcting the second raw observations using the one or more processors of the NSS receiver to provide corrected observations, the second raw observations corrected using at least a portion of the estimated receiver code biases; and determining the position of the NSS receiver using the one or more processors of the NSS receiver, the position determined based at least in part on the corrected observations.

2. Method of claim 1, wherein the step of receiving the first NSS signals comprises:
receiving the first NSS signals over the multiple epochs for at least one day.

3. Method of claim 1, wherein the step of estimating ambiguities in the carrier phase of the received first raw observations comprises:
setting the ambiguities to integers and resolving them.

4. Method of claim 1, wherein the step of computing combination values comprises computing multipath combination values of each frequency.

5. Method of claim 1, wherein the step of computing combination values comprises computing ionospheric-free code minus ionospheric-free phase combination values.

6. Method of claim 1, wherein the step of computing combination values comprises computing ionospheric code minus ionospheric phase combination values.

7. Method of claim 1, wherein the step of computing combination values comprises computing Melbourne-Wübbena combination values.

8. Method of claim 1, wherein the step of computing combination values comprises computing ionospheric-free code minus ionospheric-free phase combination values, and ionospheric code minus ionospheric phase combination values.

9. Method of claim 1, wherein the step of computing combination values comprises computing Melbourne-Wübbena combination values and ionosphere-free code minus ionosphere-free phase combination values.

10. Method of claim 1, wherein the step of computing combination values comprises computing ionospheric code minus ionospheric phase combination values and Melbourne-Wübbena combination values.

11. Method of claim 1, wherein the step of generating the correction information comprises generating the correction information per satellite and frequency and/or per satellite and linear combination of frequencies, based on the computed combination values.

12. Nontransitory computer readable medium comprising computer executable instructions configured, when executed on a computer, to carry out a method according to claim 1.

13. Apparatus configured for generating correction information associated with a global or regional navigation satellite system (NSS) receiver, wherein the correction information comprises information for correcting pseudorange observations useful for determining a position of the NSS receiver, the correction information comprising estimated receiver code biases per satellite, the apparatus comprising:
an antenna configured for receiving first NSS signals comprising multiple frequencies over multiple epochs, the NSS signals received from a plurality of NSS satellites;
one or more processors configured for:
processing the first NSS signals to provide first raw observations;
receiving precise satellite information comprising:
(i) an orbit position of each one of the plurality of NSS satellites,
(ii) a clock offset of each one of the plurality of NSS satellites, and
(iii) a set of biases associated with each one of the plurality of NSS satellites, or
information derived from the precise satellite information;
estimating ambiguities in the carrier phase of the first raw observations, the estimated ambiguities determined based on the precise satellite information or the information derived from the precise satellite information;
computing combination values to provide an observation equation system, the computed combination values determined based on the first raw observations together with the estimated ambiguities, the computed combination values canceling out effects of satellite motion relative to the NSS receiver, effects of satellite clocks, effects of the troposphere, and effects of the ionosphere; and
generating the correction information per satellite by solving the observation equation system of the computed combination values to estimate the receiver code biases per satellite.

14. NSS receiver comprising an apparatus according to claim 13, the NSS receiver further comprising:
an antenna configured for receiving second NSS signals;
processing the second NSS signals to provide second raw observations;
correcting the second raw observations to provide corrected observations, the second raw observations corrected using at least a portion of the estimated receiver code biases; and
determining the position of the NSS receiver, the position determined based at least in part on the corrected observations.

15. Network system comprising an apparatus according to claim 13, and further configured for transferring the generated correction information to the NSS receiver.

* * * * *